United States Patent [19]
Johnson

[11] Patent Number: 5,771,280
[45] Date of Patent: Jun. 23, 1998

[54] METHOD OF AND APPARATUS FOR PROVIDING ARBITRARILY DEFINED HIERARCHY MAPS DEPICTING RELATIVE GEOGRAPHICAL INFORMATION

[75] Inventor: William J. Johnson, Flower Mound, Tex.

[73] Assignee: MCI Communication Corporation, Washington, D.C.

[21] Appl. No.: 646,068

[22] Filed: May 7, 1996

[51] Int. Cl.$^6$ .................................................. H04M 11/00
[52] U.S. Cl. ........................................ 379/93.23; 379/201
[58] Field of Search ............................... 379/96–100, 90, 379/93, 94, 110, 45, 201, 93.17, 93.23, 93.25, 93.26, 93.28, 96.37, 100.01, 100.11; 358/400, 403; 340/990, 992, 993, 995

[56] References Cited

U.S. PATENT DOCUMENTS

| | | | |
|---|---|---|---|
| 4,720,849 | 1/1988 | Tayama | 379/90 |
| 5,109,399 | 4/1992 | Thompson | 379/45 |
| 5,532,838 | 7/1996 | Barbari | 358/400 |

*Primary Examiner*—Wing F. Chan

[57] ABSTRACT

The present invention discloses a method of and apparatus for determining and presenting information about the location of one party relative to the location of another party. The location may be determined from information pertaining to an active session, such as a telephone connection. A centralized address-book contains information about the location of each party listed within the address-book. An arbitrary number of map hierarchies (ranging from 1-N) is defined. Each map hierarchy comprises a plurality of geographical maps each classified as having an equivalent granularity. Each map is associated with one or more entries in the address-book. As each level of map hierarchies increase, the granularity of the maps contained therein, decrease. The location information is presented as a series of maps with a varying level of granularity. The most appropriate map based on the relative locations of the parties is automatically selected. Additionally, any of the maps within the set of associated maps may be viewed. A privacy feature is provided that allows a party to selectively grant viewing permission to others and/or prevent others from viewing their location information.

23 Claims, 11 Drawing Sheets

FIG. 3

AB TABLE

| | NAME 308 | ADDRESS 310 | CITY 312 | STATE 314 | COUNTRY 316 | SITE 318 | OFFICE 319 | PHONE NO. 320 | LOCATION PRIVACY INDICATOR 322 | LOCATION PRIVACY PASSWORD 324 | LAST PERSON MAPPED 326 | ACCESS STATUS 328 |
|---|---|---|---|---|---|---|---|---|---|---|---|---|
| 210a | | | | | | | | | | | | |
| 210b | | | | | | | | | | | | |
| 210c | | | | | | | | | | | | |
| 210j | JOHN DOE | 212 MAIN ST. | AUSTIN | TX | USA | 632 | 210 | 214-918-1212 | YES | XXXX | 212-371-2121 | OK |
| 210q | JOHN DEER | 154 E 79 ST. | NEW YORK | NY | USA | - | 103 | 212-371-2121 | NO | - | - | NOT-OK |
| 210n | | | | | | | | | | | | |

FIG. 4

MAP TABLE 204 / 402

| HIERARCHY # 408 | MAP POINTER 410 | AB FIELD REFERENCE 412 | DESCRIPTION 414 | AB FIELD VALUE 416 | POINT REFERENCE 418 | POINT DESCRIPTION 420 |
|---|---|---|---|---|---|---|
| 1 | c:/country/usa.map | COUNTRY | COUNTRY OF RESIDENCE | USA | STATE | STATE OF RESIDENCE |
| 1 | c:/country/german.map | COUNTRY | COUNTRY OF RESIDENCE | GERMANY | CITY | CITY OF RESIDENCE |
| 2 | c:/state/tx.map | STATE | STATE OF RESIDENCE | TX | CITY | CITY OF RESIDENCE |
| 2 | c:/state/ny.map | STATE | STATE OF RESIDENCE | NY | CITY | CITY OF RESIDENCE |
| 3 | c:/city/austin.map | CITY | CITY OF RESIDENCE | AUSTIN | NULL | NULL |
| 3 | c:/city/dallas.map | CITY | CITY OF RESIDENCE | DALLAS | CITY | CITY OF RESIDENCE |
| 4 | c:/floor_plan/632.map | SITE | CORPORATE SITE NUMBER | 632 | OFFICE | LOCATION OF OFFICE |
| 4 | c:/floor_plan/633.map | SITE | CORPORATE SITE NUMBER | 633 | NULL | NULL |

CHILD POINT TABLE 422 / 401

| HIERARCHY # 428 | MAP POINTER 430 | AB FIELD VALUE 432 | COORDINATES 434 |
|---|---|---|---|
| 1 | c:/country/usa.map | OREGON | 20, 480 |
| 2 | c:/state/tx.map | AUSTIN | 300, 60 |
| 2 | c:/state/nc.map | RALEIGH | 600, 350 |
| 4 | c:/floor_plan/632.map | F-310 | 259, 32 |

METHOD OF AND APPARATUS FOR PROVIDING ARBITRARILY DEFINED HIERARCHY MAPS DEPICTING RELATIVE GEOGRAPHICAL INFORMATION

BACKGROUND OF THE INVENTION

1. Field of the Invention

The present invention relates to telecommunications, and more specifically to a method of and apparatus for providing geographical location data of one party at one end of a telephone conversation relative to the location of another party at the opposite end of the telephone conversation.

2. Related Art

Often when people converse over the telephone, one party requires information pertaining to the location of the other party. Such information is often difficult to convey. This is especially apparent when both parties are not familiar with the other party's location. In order to successfully provide directions, a common location such as a landmark, highway, or road, that is known to both parties must be determined. This common location is used as a starting point for the directions. If a common location cannot be found, the directions are often inaccurate and/or incomplete. Moreover, communicating directions over the telephone is time consuming, and mistakes are commonplace.

The difficulties typically encountered while attempting to communicate directions over the telephone are numerous. Part of the problem relates to the fact that the directional information being sought is graphical in nature. Thus, conveying such information over a common telephone which transmits only audio signals, presents inherent difficulties. Other difficulties arise from the fact that names, numbers, streets, highway exits, and the like, are often not precisely known or remembered by the direction giver. Still further, such information is easily mis-communicated by the direction giver, and/or easily misunderstood by the direction taker.

Organizations that depend on customers visiting their places of business, typically encounter such problems on a daily basis. Large retail stores for example, receive multiple phone calls each day requesting directions. It is often difficult and time consuming to covey such information over the telephone especially because such calls originate from a variety of different locations. Inaccuracies and/or untimely delays in responding to such requests can result in a loss of revenue for such organizations.

Emergency response units including those that provide police, fire and ambulance services, often need to locate a caller at the other end of a telephone conversation. Because of the nature of these emergency situations, the street address, for one reason or another, is often not communicated to the service provider. Thus, many emergency units use some variation of an automated method that determines the caller's street address from the information provided by the live telephone connection. Typically, a conventional road map publication or the like, is manually used to look-up the street address and to determine directions therefrom. This process is time-consuming. Further, operator mistakes, missing or out-of-date maps, and other mistakes arising from this manual process can cause additional delays that can be catastrophic in such emergency situations.

SUMMARY OF THE INVENTION

The present invention discloses a system and method for determining and presenting information about the location of one party relative to the location of another party. Devices such as video telephones, computer display systems, and/or cable television units, connected together with communications are used to display graphical data. A centralized database contains information about each individual within a group. A database that encompasses a particular group of individuals is hereinafter referred to as an 'address-book'. Each address-book entry contains information about a particular party or individual. Such information includes for example, a name, an address and a telephone number. In addition, location information is defined for each entry in the address-book.

Each entry in an address-book is logically associated with a plurality of geographical maps. Each map that is associated with a particular address-book entry is a graphical representation that encompasses particular location information defined for that entry. Further, the maps are classified and assigned into groups arranged in a numerical hierarchy. An arbitrary number of map hierarchies (ranging from 1-N) can be defined for each implementation of the present invention. The hierarchy of map classifications are preferably enumerated from the least to the most granular. The granularity of maps as described in this disclosure, pertains to the extent of the geographical area represented therein. Typically, the greater the geographical area, the higher the granularity. For example, a map that depicts the state of Texas is described as being less granular or having a lower degree of granularity than a map that depicts the entire United States of America.

Thus, according to the present invention, each map is assigned to a particular group of maps (hereinafter each group is referred to as a 'map hierarchy'). The groups are enumerated according to its granularity relative to the other groups of maps. For example, in a particular embodiment of the present invention, a representation of Western Europe may be included in a map hierarchy of 1, while a representation of a building's floor-plan may be included in a map hierarchy of 10.

Each map, in each map hierarchy, identifies one or more entries in an address-book that is associated with the map. For example, in one embodiment of the present invention, a map of the United States will correspond to all of the entries in a particular address-book of people which define the United States as the country of residence. Likewise, a map of the State of Texas will identify all of the entries in an address-book which define Texas as the state of residence. Each entry in an address-book is typically associated with one or more maps, where each map is assigned to a different map hierarchy, as is appropriate for particular information or fields contained within the address-book.

The present invention provides a means to display geographical data between users that share a common address-book. An individual user makes a request (the requester) to see geographical information about another individual user (the requestee). A map that is the most appropriate map for the requestor is automatically selected among the requestee's set of associated maps. In addition, a list of the other maps that comprise the requestee's set of associated maps are presented so that the requestor may select and view any one of the requestee's associated maps.

The best or most appropriate map that is automatically selected according to the present invention is based upon the location of the requestor relative to the location of the requestee. For example, if both the requester and the requestee are located in the same country, but different states, a map of the requestee's state will be presented to the requester. If both parties are located in the same state but different cities, a map of the requestee's city will be presented to the requester. Likewise, if both parties are located in the same city, but work at different corporate sites, a map depicting the requestee's site will be presented to the requestor. Finally, if both parties work within the same corporate site, a floor-plan of the requestee's building will be presented to the requester. In each case, one or more points on the map related to the requestee's location may be highlighted.

The request for geographical information may be initiated using several methods depending on the specific implementation of the present invention. In one embodiment, a request is initiated during a live telephone conversation. In this case, the telephone connection is used to identify the requestor and requestee in order to determine their locations as described in an address-book. In another embodiment, a computer system is used independently of a live telephone conversation. Data defining the request for geographical information is directly input into a computer system which interfaces with the map and the address-books database(s), as discussed herein.

Additionally, the present invention provides a means to maintain privacy for each individual that has an entry in an address-book. This capability allows individual participants to specify whether permission should be granted to allow others to view geographical information about themselves. In one embodiment of the present invention, permission is dynamically granted by a requestee to a requestor, on a per telephone call basis.

Features and Advantages

Accordingly, a feature of the present invention is that it provides a geographical display of a first party's location relative to a second party's location.

Another feature of the present invention is that location information is automatically determined based on an active communication session or circuit.

Another feature of the present invention is that it provides users with clear and precise directions to enable travel from one location to another.

Yet another further feature of the present invention is that the location information is provided by a set of maps that can be viewed individually, where each map depicts a different granularity. A best default map for first display from among the set of maps is automatically selected according to the proximity of a requestor and requestee.

Further, a feature of the present invention is that it provides an option so that privacy and security are maintained regarding the revealing of the location of a party. A first party can only access location information of a second party if the second party has granted universal access, or if the second party has requested privacy and has granted access to the first party for a specific access (e.g. one time).

An advantage of the present invention is that it can be implemented using existing databases and communication equipment.

Another advantage of the present invention is that it can be implemented using existing address-book databases. No modifications are necessary to existing address-book databases. The present invention references fields which are already defined in existing address-book databases.

A further advantage of the present invention is that the address-book database requires no modification when maps are added, deleted, or modified.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein:

FIG. 3 is a block diagram showing the contents of an address-book table according to a preferred embodiment of the present invention;

FIG. 4 is a block diagram showing the contents of a map table and a child point table according to a preferred embodiment of the present invention;

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
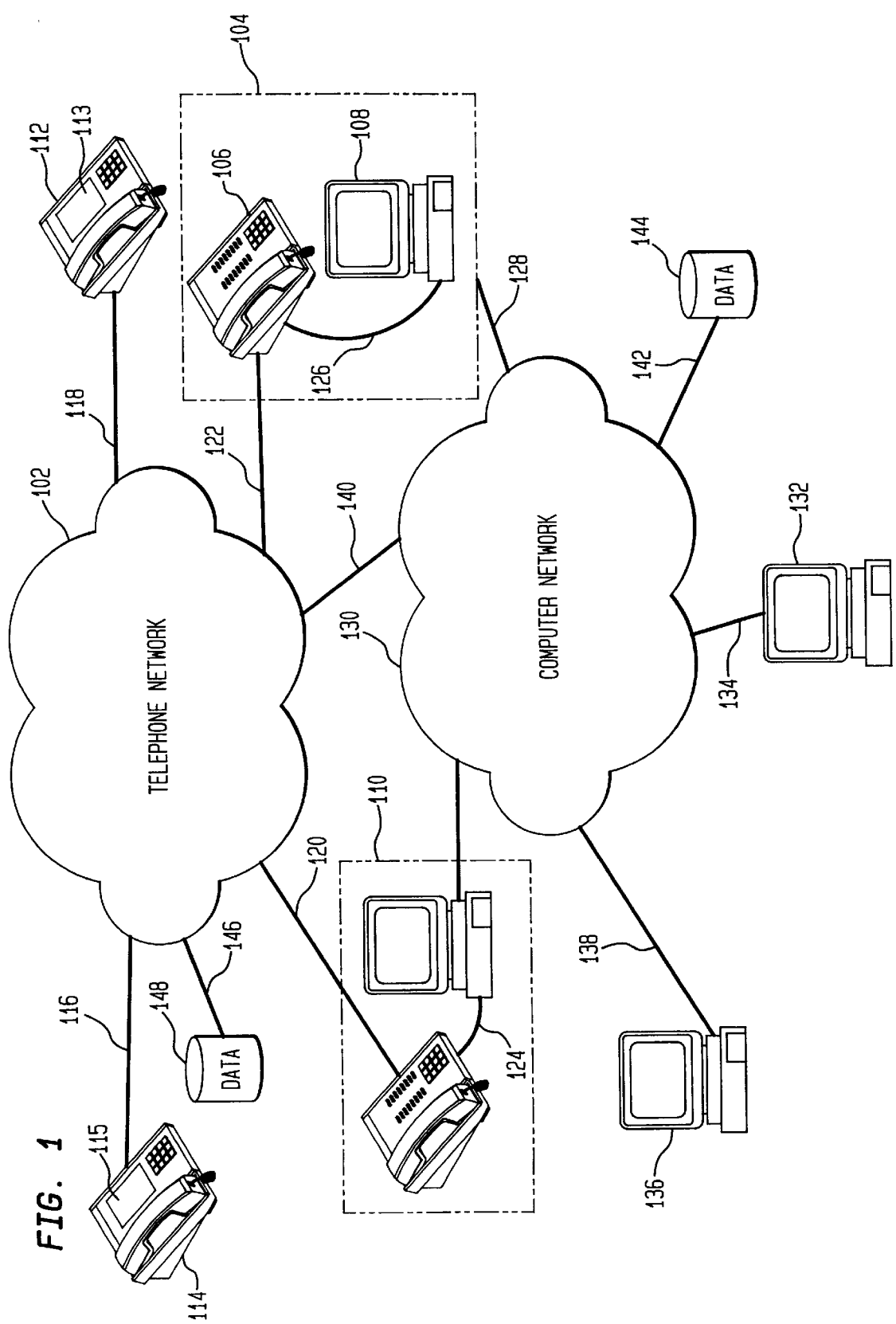
FIG. 1 is a block diagram showing an environment in which various preferred embodiments of the present invention operate.

FIG. 1 depicts an operative environment according to various preferred embodiments of the present invention. The present invention may be implemented with the use of a telephone network 102, a computer network 130, or a combination thereof (depicted by the bridge 140 that couples the telephone network 102 with the computer network 130).

As can be seen by FIG. 1, three pairs of similar devices are depicted: a pair of video telephones (112 and 114); a pair of telephone/computer systems (110 and 104); and a pair of computer operator terminals (132 and 136). As will be appreciated, most embodiments of the present invention include at least one pair of devices which function as a requestor/requestee pair. Thus, it is assumed in the examples below, that each pair of similar devices perform the functions associated with a requestor/requestee pair. The specific methods and procedures associated with such functions will be subsequently described herein.

In one embodiment of the present invention, video telephones 114 and 112 are used. The video telephones 114 and 112 are connected to the telephone network 102, via communication links 116 and 118 respectively. The video telephones 114 and 112 each include a video monitor 115 and 113. The video monitors 115 and 113 are used to display graphical map data according to the present invention.

Note that the video telephones 114 and 112 can be any telephonic device capable of displaying graphical image data. Such devices may be connected to the telephone network 102 by traditional telephone lines, or by any other means such as fiber optical cables or wireless transmissions. An example of such a device is a hand-held computer with cellular capabilities such as the commonly available 'Newton' manufactured by Apple Computer Corporation. Alternatively, any telephonic device that is coupled with a computer and graphics system (hereinafter, such devices are referred to as a 'smart-phones') can be used as the video telephones 112 and 114 depicted in FIG. 1.

A computer database 148 which comprises map and address-book data according to the present invention (as will be described in detail below) is provided. Access to the database 148 is accomplished through appropriate connectivity by the telephone network 102. Thus, the information contained in the database 148 is available to the smart-phones 112 and 114. The database 148 is connected to the telephone network 102, via the data link 146.

An alternate embodiment may utilize a computer database 144 which comprises the map and address-book data. Access to the database 144 is accomplished via the bridge 140, which links the telephone network 102 with the computer network 130. Thus, the information contained in the database 144 is available to the smart phones 112 and 114. The database 144 is connected to the computer network 130, via the data link 142.

In another embodiment of the present invention, telephone/computer systems 104 and 110 are used. An example of such a device is the commonly available ROLM 244 PC manufactured by ROLM Corporation. Telephone/computer system 104 includes a telephone 106 which is attached to, and in data communications with, a computer system 108 via a serial transmission link 126. The telephone 106 is connected to the telephone network 102 via communication link 122. The computer system 108 is connected to a computer network 130 via data link 128. The computer system 108 accesses the data base 144 via the computer network 130 and the transmission link 142. Similarly the computer system 108 has access to information related to telephone connections associated with the telephone 106. The telephone/computer system 110 is similar to the telephone/computer system 104.

In another embodiment of the present invention, computer terminals 132 and 136 are used. The computer terminals 132 and 136 are linked with the computer network 130 via the data links 134 and 138 respectively. The computer systems 132 and 136 have access to the database 144 via the data link 142.

In other embodiments of the present invention, combinations of the three types of devices, namely the video telephone device (such as device 112), the telephone/computer device (such as device 104) and the computer system (such as device 132), may be used in a single environment. For example, a smart-phone (such as smart-phone 114), may be used as a requestor and a telephone/computer system (such as telephone/computer system 104), may be used as the corresponding requestee. Additionally, other devices not depicted by FIG. 1, but that perform the same function may be used. Thus, the examples presented in FIG. 1 should not be construed to limit the scope of the present invention.

The address-book and map databases according to the present invention will now be described with reference to FIG. 2. The address-book database 201 comprises a plurality (n) of individual address-book entries 210a, 210b, 210c . . . 210n (generally 210). Each address-book entry 210 comprises specific information pertaining to a particular individual (also referred to as 'party' or 'participant'), within the group of individuals that comprises the address-book 201. An example of such specific information will be subsequently described herein with reference to FIG. 3.

The map database 204 comprises a plurality N of map hierarchies 202A, 202B, . . . , 202N (generally 202). Each map hiearchy 202 comprises a plurality (n) of individual map entries (each map entry is generally referenced as 208). As shown, map hierarchy 1 (202A) comprises individual map entries 208A1, 208A2, . . . 208An. Map hierarchy 2 (202B) comprises individual map entries 202B1, 202B2, . . . , 202Bn. Finally, map hierarchy N (202N) comprises individual map entries 208N1, 208N2, . . . , 208Nn.

Each map entry 208 comprises specific information that corresponds to a particular geographical map. For example, map entry 208An comprises specific information that corresponds to the geographical map 220. Thus, it may be said that map entry 208An corresponds to the geographical map 220. Likewise, map entry 208Bn corresponds to the geographical map 222. Similarly, snap entry 208Nn corresponds to the geographical map 224. Each individual map entry 208 corresponds to a particular geographical map (such as map 220).

Each map entry 208 is assigned a particular map hierarchy 202 (hierarchy 1–hierarchy N), according to the granularity of its corresponding geographical map. Each map, (such as map 220), that is associated with a particular map hierarchy (such as map hierarchy 202A), is preferably of the same granularity as the other maps associated with the same map hierarchy 202A. The enumeration of the map hierarchies 202 range from 1 to N, where the maps associated with the map hierarchy 1 (202A), have the highest granularity, and the maps associated the map hierarchy N (202N) have the lowest or finest granularity. This characteristic of the present invention is depicted by the granularity legend 218 shown on the bottom of FIG. 1.

Figure 2:
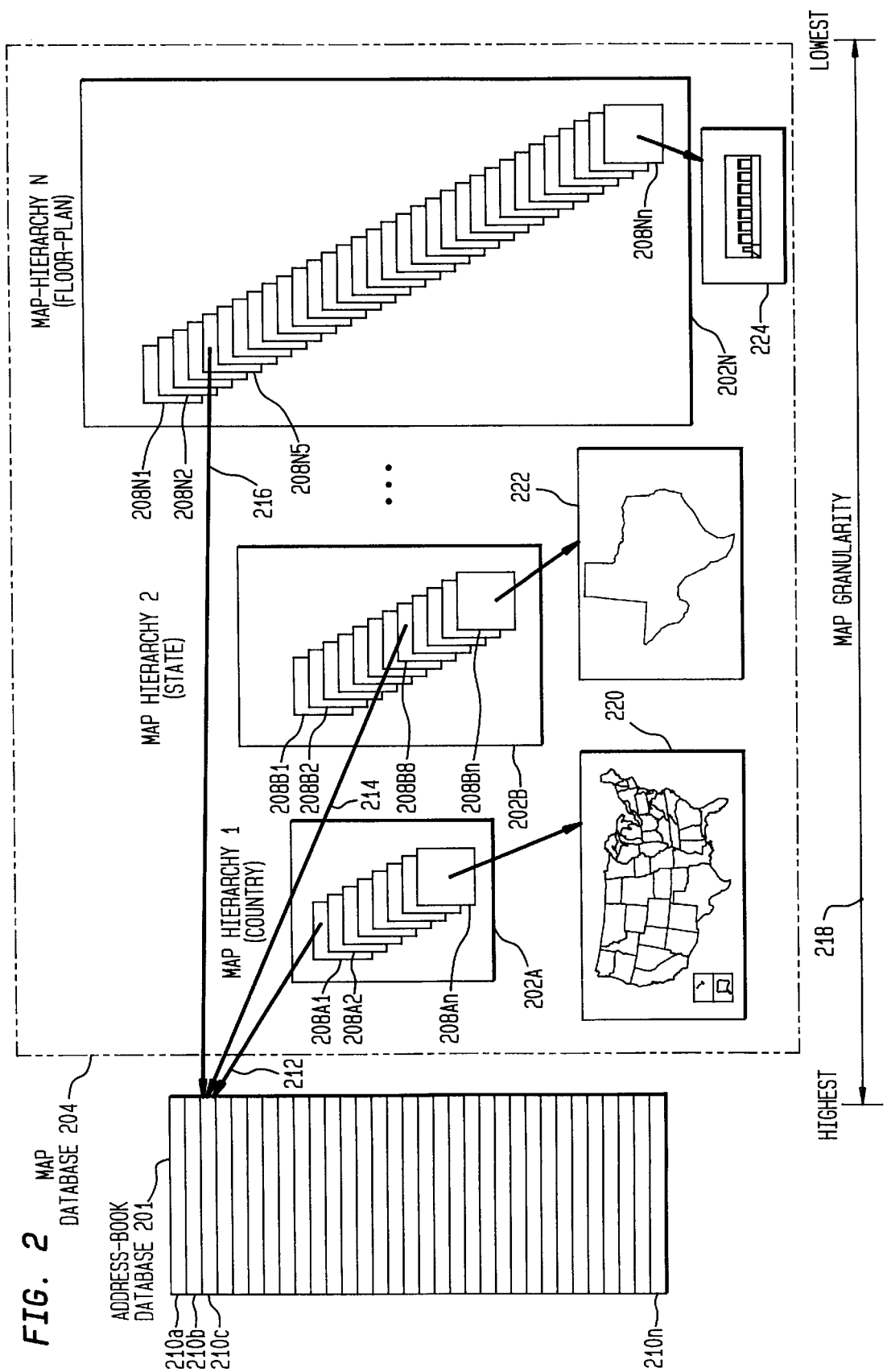
FIG. 2 is a block diagram showing an address-book and a set of map hierarchies according to a preferred embodiment of the present invention.

Accordingly, as can be seen in FIG. 2, each map corresponding to map hierarchy 1 (202A), depicts a particular country. For example, the map corresponding to the map entry 208A1 may depict Canada, and the map corresponding to the map entry 208A2, may depict Columbia. Each map entry 208 that is assigned to map hierarchy 1 (202A), corresponds to a map having a granularity equivalent to a map depicting a particular country. For example, the map entry 208An corresponds to the map of the United States 220.

Similarly, each map associated with the map hierarchy 2 (202B) depicts a particular state or other lower granular area. Accordingly, the map corresponding to the map entry 208B1 may depict Virginia, and the map corresponding to the map entry 208B2 may depict Oregon. Each map entry 208 that is assigned to map hierarchy 2 (208B), corresponds to a map having a granularity equivalent to a map depicting a particular state. For example, the map entry 208Bn corresponds to the map of the Texas 222. As shown in FIG. 2, the progression of map hierarchies (from map hierarchy 1 202A to map hierarchy N 202N), continues in this fashion. As each level of map hierarchies 202 increase, the granularity of its associated maps decrease.

For example, further map hierarchies may have corresponding maps that depict cities such as San Fransisco, Venice, or Chicago. Other map hierarchies may have corresponding maps that depict towns, neighborhoods or the like. The progression of map hierarchies 208 continue in this fashion until the map hierarchy with the lowest granularity defined for the particular application of the present invention is reached. In this case, as shown in FIG. 2, the map hierarchy with the lowest granularity defined for this application of the present invention is the map hierarchy N (202N). The map hierarchy N (202N) is comprised of map entries 208 that correspond to a maps depicting a particular floor-plan, such as the floor-plan map 224.

The definition and the amount of map hierarchies depend on each particular implementation of the present invention. For example, a map hierarchy at the floor-plan level would be appropriate in a corporate environment or the like. In other implementations of the present invention, a group of maps depicting cities may comprise the map hierarchy with the lowest level of granularity.

In addition to the association linking each map entry with a corresponding geographical map, each map entry 208 comprises specific information that associates it with one or more address-book entries 210 in the address-book 201. For example, the map entry 208A1 is associated with the address-book entry 210c, as shown by pointer 212. Likewise, the map entry 208B8 is associated with the address-book entry 210c, as shown by pointer 214. Similarly, the map entry 208N5 is associated with the address-book entry 210c, as shown by pointer 216.

Note that each map entry 208 may have multiple address-book entries 210 associated with it. For example, the map entry 208An, which corresponds to the map of the United States 220, may have numerous address-book entries 210 associated with it. In this case, the map entry 202n will typically 'point to' all of the address-book entries 210 that specify 'USA' as the country of residence. Similarly, the map entry 208Bn (which corresponds to the map of Texas 222), will typically point to all of the address-book entries 210 that specify 'TX' as the state of residence.

Each address-book entry 210 should not be associated with more that one map of the same map hierarchy 202. For example, suppose the address-book entry 210a contains information pertaining to a participant that resides in Texas, USA. Thus, only one map entry (namely, the map entry 208An, which corresponds to the map of the United States 220) within the map hierarchy 1 (202A) refers to the particular address-book entry 210a. Likewise, only one map entry (namely, map entry 208Bn, which corresponds to the map of Texas 222), within the map hierarchy 2 (202B), refers to the address-book entry 210a.

Additionally, note that each address-book entry 210 is not necessarily associated with a map entry in each of the hierarchies 208 that is defined for a particular embodiment of the present invention. For example, suppose that floor-plan information is unavailable or inappropriate for the owner of the address-book entry 210a. In this case, the address-book entry 210a does not have an association with any map entry 208 that is assigned to the map hierarchy N (202N).

Typically, each address-book entry 210 has associated with it, a plurality of geographical maps (such as map 220) that span the various hierarchies (1-N) 202A–202N. Accordingly, each address-book entry 210 has one associated map (such as map 220), within each map hierarchy 202. For example, suppose the owner of address-book entry 210a works in office number F-210, building 632, located on site 124, in Austin Texas USA. In this example, the address-book entry 210a will have 5 geographical maps associated with it, which range in hierarchy from 1 to 5. The 5 associated geographical maps may be as follows: hierarchy 1 - USA; hierarchy 2 Texas; hierarchy 3 - Austin; hierarchy 4 - site 124; and hierarchy 5 - building 632.

In addition, a child point table (described below), may be used to highlight a point (on the display device) within each map. The highlighted point typically depicts a location associated with the map of the next hierarchy as defined in the address-book entry 210. For example, a point is defined (in a child point table, described below) to highlight on the map of the USA 220, the state of Texas. Likewise, a point is defined to highlight on the map of Texas 222, the location of the city of Austin. A point on the map within hierarchy 3 (Austin) is defined to highlight the location of the corporate site 124. A point on the map within hierarchy 4 (site 124) is defined to highlight the location of the office building 632. Finally, a point on the map within hierarchy 5 (building 632), is defined to highlight the location of the office number F-210.

Note, in this example, there is no geographical map associated with the lowest level of granularity defined for the location specified in the address-book entry 210. Accordingly, in this example, there in no map that is classified as a map within hierarchy 6 which depicts the office location F-210. This can be the case since the child point table information (described below), enables the present invention to display information pertaining to a finer level of granularity as a highlighted point on the display of the map associated with a next level of granularity. For example, in this case, the office F-210 is displayed as a highlighted point on the map associated with the map which is associated with map hierarchy 5 (site 632). Details pertaining to the child point table will be subsequently described herein.

An embodiment of the present invention will now be described with reference to FIGS. 3 and 4. In these examples, the address-book database 201 and the map database 204 are each implemented using data tables. In addition a third data table referred to herein as the child point table will be described with reference to FIG. 4. The use of such data tables to describe the specific contents of database elements is well known and would be apparent to those skilled in the relevant art(s).

The present invention may be implemented using any one of a variety of well known database application programs. An example of such a well known database application program is the DB2 family of products manufactured by IBM Corporation. DB2 uses a standard language known as Standard Query Language (SQL) for the storage, retrieval and manipulation of data, via data tables such as the data tables described below. As such, use of data tables as presented herein is particularly adaptable for use with SQL and/or similar database base query languages. However, the present invention may be implemented using a variety of data base tools on a variety of computer platforms. The implementation of the present invention using such tools will be apparent to those skilled in the relevant art(s).

The address-book 201 may be implemented using an address-book table as shown in FIG. 3. The address-book table 201 can be logically viewed like a spreadsheet which contains horizontal rows (such as row 210j), and vertical columns (such as column 308). In general, each row (such as the row 210j) contains a single record or individual address-book entry (generally 210) as previously described. Each column in address-book table 201 contains a single field that encompass all of the records 210 in the address-book table 201. For example, the column 308 contains the names defined for all of the entries 210 within the address-book table 201.

The address-book table 201 contains the titles of the fields defined for the 5 particular address-book table 201. The titles are shown as a first row 302 in FIG. 3. The field title, such as the 'Name' field title 308, is also referred to as a 'field reference'. The value associated with a field reference is referred to as a 'field value'. For example, in the record 210j, the address-book field value corresponding to the 'Name' address-book field reference 308 is defined as 'John Doe'. It may also be stated more simply that the 'Name' field 308 in record 210j contains 'John Doe'. Further, the address-book table 201 comprises n records, where record 210a is the first record and record 210n is the last record. The term 'record' and 'entry' are synonymous and are used interchangeably herein. A specific cell may be referenced herein by using the reference number of the row in conjunction with the reference number for the column. For example, the cell that contains the name 'John Doe' will be referenced as follows: '(210j, 308)'.

The specific fields depicted in the example in FIG. 3 will now be discussed. Most of the fields that comprise the address-book table 201 are commonly included in most address-book type data tables. For example, the name, address, and phone number of each participant is defined in the address-book field references - 'Name' 308, 'Address' 310, 'City' 312, 'State' 314, 'Country' 316, and 'Phone No.' 320. The address-book field reference 'Site' 318 is used herein to identify a corporate site or building associated with the address-book record 210. The address-book field reference 'Office' 319 contains the office number associated with the owner of an address-book record 210. As stated, the above or similar field references are commonly found in many address-book databases or data tables of this type. The remaining four field references 322–328 are unique to the present invention and will be discussed immediately below. Note however, that the inclusion of the remaining four field references may be implemented by adding the four fields to an existing data table, (as shown in FIG. 3), or by creating a new table. The advantage of creating a new table is that an existing address-book table need not be modified in order to implement an embodiment of the present invention. The new table will comprise the four unique fields 322–328 plus an additional field from the existing table used to join the two tables. For example, the 'Phone No.' field 320 may be used to join the first existing table (described above), with the new table (described below). This table joining capacity will be apparent to those skilled in the relevant art(s). Alternate embodiments may use some other unique data to accomplish the join, for example, social security number, employee serial number, etc.

The address-book field reference 'Location Privacy Indicator' 322 contains the field values of either 'Yes' or 'No'. This field is modified by the owner of each record and is used to indicate whether the owner would like control over who can gain access to their location information. For example, if a record owner specifies 'No' in this field, any valid requestor may access the location information associated with the record owner. If the record owner specifies 'Yes' in this field, no one can gain access to the record owner's location information, unless the record owner grants permission. Typically such permission is granted on a per-request basis.

The address-book field reference 'Location Privacy Password' 324 contains an encrypted password that is defined by the record owner. The record owner uses this password to grant permission to a requestor. That is, the password is used to allow access to the record owner's location information. If the 'Location Privacy Indicator' field 322 is set to 'No', the password field 324 is not used, since all requesters will have automatic access to the record owner's location information. However, if the 'Location Privacy Indicator' 322 is set to 'Yes', the use of the password 324 prevents unauthorized granting of privileges. The 'Location Privacy Password' field allows access to be granted to a requester, by a requestee, where the requestee may or may not be the owner of the row in address-book table 201. It also enables granting access from an arbitrary telephone connection. Typically, access is granted to a person who is currently on the telephone. Note that this field may not be necessary in embodiments which use existing passwords for address-book record modification, voice mail systems, or the like. In such cases, the existing passwords are used in place of the 'Location Privacy Password' 324.

The 'Last Person Mapped' field contains an identification, such as the telephone number, of the party in which location information was, or will be, viewed by the record owner. For example, suppose the record owner of record 210j (the requestor), requests information pertaining to the location associated with the record 210q. As can be seen in FIG. 3, record 210q contains 'No' in the 'Location Privacy Indicator' field (210q, 322). Thus, as discussed above, permission to view such location information is automatically granted to the requester. Consequently, the telephone number associated with record 210q (the requestee's telephone number) is recorded in the 'Last Person Mapped' field of the requestor's record (210j, 326). Alternative embodiments may utilize some other unique data to associate a party through the 'Last Person Mapped' field 326, for example, social security, employee serial number, etc.

The 'Access Status' field is a hidden field that is not modifiable by the record owner. The field value may be either 'OK' or 'NOT_OK'. This field is used in conjunction with the 'Last Person Mapped' field 326. A value of 'OK' indicates that the record owner may access the location information associated with the address-book record 210 identified by the 'Last Person Mapped' field as previously described. A field value of 'NOT_OK', indicates that the record owner may not access the location information associated with the record identified by the 'Last Person Mapped' field as previously described. This field is used by the present invention to control privacy as described in greater detail herein.

Referring now to FIG. 4, the map data is implemented using a map table 204. The map table 204 comprises n records or entries 208a, 208b, . . . , 208n. Note that any number of records (n) are possible. Further, this number (n) is not associated with the number (n) previously used to describe the number of records 210 in the address-book table 201. Also note that the reference numbers such as 208a, 208b, etc. are used for convenience only and do not indicate the position of the entries in the map table 204. For example, entry 208a is not necessarily the first entry in the table. The entries referred to in this example (208a, 208b, 208c, 208d, 208e, 208f, 208g, and 208n), are arbitrary entries which can be located anywhere within the map table 204. In this example, as in the preferred embodiment of the present invention, the map table entries are sorted by hierarchy number.

The 'Hierarchy #' field 408 contains the assigned hierarchy number for the map that is associated with the current record. As described, a hierarchy number of 1 indicates the associated map is of the highest granularity and a hierarchy number of N indicates the associated map is of the lowest granularity, as defined in a particular map table. An administrative process used to add, modify and delete map table entries 208 within the map table 204 is subsequently discussed with reference to FIG. 5.

The 'Map Pointer' field 410 is used to associate a particular geographical map with each record in the map table 204. As previously discussed, each entry (or record) 208 in the map table 204 corresponds to a particular geographical map (such as the map 220). In the example depicted in FIG. 4, this association is accomplished by using the fully qualified file name of the corresponding map image file in the 'Map Pointer' field 410 within each map entry 208. For example, the map record 208a contains a value of 'c:\country\usa.map' (208a, 410) in the 'Map Pointer' field 410. In this example a DOS file format is used. Different file formats will be used with other embodiments of the present invention. Additionally, in still other embodiments of the present invention, file names will not be used at all. Any method that uniquely identifies a particular map image can be used in conjunction with the 'Map Pointer' field 410. Other examples of values that can be specified in the 'Map Pointer' field 410 include an index number which identifies a map within a group of maps, or a memory address which identifies a map within a memory storage device.

The 'Address-Book Field Reference' field 412 identifies the field reference in the associated address-book table 201, that is used to associate a map entry 208 with one or more address-book entries 210. The value used in the 'Address-Book Field Reference' field 412 must match one of the field references defined in the associated address-book table 201. That is, any of the field references shown in the first row 302 within address-book table 201, are valid as a value for the 'Address-Book Field Reference' field 412. This field is used in conjunction with the 'Address-Book Field Value' field 416 as described below.

The 'Address-Book Field Value' field 416 is used to associate a particular map entry 208 with one or more address-book entries 210. This field is used in conjunction with the 'Address-Book Field Reference' field described above. For example, map entry 208a contains the value of 'USA' in the 'Address-Book Field Value' field (208a, 416), and a value of 'Country' in the 'Address-Book Field Reference' field (208a, 412). Theses values indicate that the map entry 208a is associated with all of the address-book records 210 which contain 'USA' in the 'Country' field 316. Thus, records 210j and 210q are each associated with map table entry 208a.

In addition,'wildcards' may be used to associate a plurality of address-book entries 210 with a particular map table record 208. For example, suppose that every person working in a particular corporate building has a telephone number that begins with '214–918'. This information can be used to associate a map table entry with all of the participants that work in the building according to the telephone numbers listed in the address-book 201. Accordingly, the values 'Phone no.' and '214–918*' are specified in the map table fields 'Address-Book Field Reference' 412 and 'Address-Book Field Value' 416 respectively (the '*' is a wildcard that represents a single character or multiple characters). Consequently, all of the entries in the address-book 201 that have a telephone number that begins with '214–918' will be associated with the particular map entry.

The 'Description' field 414 is used to provide a human readable description of the map associated with each map entry 208. As previously stated, in addition to the presentation of the best or most appropriate map (according to the relative location of the requestee and the requestor), a scrollable list containing a description of the requestee's associated maps is presented to the requestor. From this list, the requestor may select and view any of the requestee's associated maps. The description of the associated maps presented to the requestor in the scrollable list is provided by the values contained in the 'Description' field 414, with in the map table 208.

For example, suppose the list of associated maps for a particular requestee are those maps associated with the map entries 208a, 208c, and 208e. In this case, presented to the requestor is a scrollable list window in which each line contains the value provided by the 'Description' field 414 for each of the corresponding map records 208a, 208c, and 208e. Thus, the scrollable list comprises: 'Country of residence' (208a, 414); 'State of residence' (208c, 414); and 'City of residence' (208e, 414). From this list, the requestor may select a particular map to view. Details of this procedure will be subsequently provided herein. The 'Point Reference' field 418 and the 'Point description' field 420 are used to describe data pertaining to the child point table 401. A value of zero in both fields 418 and 420 indicate that there is no child point information associated with the particular map entry 208. If there is child point table information associated with a particular map entry 208, the 'Point Reference' field 418 and the 'Point Description' field 420 are used as follows.

Like the previously described 'Address-Book Field Reference' field 412, the 'Point Reference' field 418 identifies the field reference in the associated address-book table 201, that is to be used to associate a child point table entry 424 with one or more address-book entries 210. The value used in this field is to match one of the field references defined in the associated address-book table 201. For example, any of the field references shown in the first row 302 within address-book table 201 are valid values for the 'Point Reference' field 418. This field is used in conjunction with the 'Address-Book Field Value' field 432 within the Child Point Table 401, as described below.

The 'Point Description' field 420 is used to provide documentary information to a requestor, pertaining to the display of a map containing a highlighted point as specified by the child point table (described below). For example, suppose a map of the USA is displayed along with a highlighted point that depicts the location of the State of Texas. In this case, the value contained in the 'Point Description' field 420 is used to display additional information about the highlighted point, such as 'State of Residence' (208a, 420).

The child point table 401 will now be described with reference to FIG. 4. The child point table comprises n entries 424a, 424b, . . . , 424n (generally, 424). Note that any number of entries or records (n) are possible and this number is not associated with the number (n) previously used to describe the number of records 210 in the address-book table 201, or the number (n) previously used to describe the number of records in the Map Table 204. Also note that the reference numbers such as 424a, 424b, etc. are used for convenience only and do not indicate the position of the entries in the table. For example, entry 424a is not necessarily the first entry in the child point table 401. The entries referred to in this example (424a, 424b, 424c, and 424d), are arbitrary entries which can be located anywhere within the map table 204. In this example, as in the preferred embodiment of the present invention, the child point table entries 424 are sorted by hierarchy number.

The 'Hiearchy #' field 428 and the 'Map Pointer' field 430 are both used to join the child point table 401 with the Map Table 204. Specifically, these two fields are used to match each child point table entry 424 with a particular corresponding map table entry 208. In this example, two fields are used together ('Hierarchy #' field 428' and 'Map Pointer' field 430), in order to uniquely identify a particular map entry 208 within the map table 204. Two fields are used in this example because it is possible to specify the same map (such as map 220) in more than one map entry 208. However, the same map (such as map 220) is not specified in more than one map entry 208 having the same hierarchy. Thus, the combination of the two fields serve to uniquely identify a particular map entry 208 with each child point table entry 424.

The 'Address-Book Field Value' Field 432 is used to associate a particular child point table entry 424 with one or more address-book entries 210. This field is used in conjunction with the 'Point Reference' field 418 within the associated map table entry 208. Wildcards may be used to associate a plurality of address-book entries 210 with a particular child point table record 424.

The Coordinates field identifies the point in the associated map image file that is to be highlighted. Various embodiments of the present invention will represent coordinates differently, for example polar or Cartesian coordinates can be used. Any method which identifies a specific point within a map graphic can be used. An example of the principals outlined above will now be presented with reference to FIGS. 3 and 4.

Suppose a record owner of address-book record 210*q* makes a request to see the location information associated with the address-book record 210*j*. In this example, the owner of address-book record 210*q* is the requestor and the owner of record 210*j* is the requestee. The following example is presented to demonstrate the interrelation between the address-book table 201, the map table 204 and the child point table 401.

In order to identify the plurality of maps associated with the requestee's address-book entry 201*j* each entry 208 in the map table 204 is compared against the address-book entry 210*j*. For each map table entry 208, the values in the 'AB Field Reference' and 'AB Field Value' fields (412 and 416) are compared against the corresponding fields in the address-book table entry 210*j*, to determine if an association exists.

In this case, the map table record 208*a* contains the value of 'Country' in the 'Address-Book Field Reference' field 412, and the value of 'USA' in the 'Address-Book Field Value' field 416. These values are compared against the corresponding values in address-book entry 210*j*. Thus, since the 'Country' field 316 contains the value of 'USA' (210*j*, 316), a match is found indicating an association between the map table record 208*a* and the address-book record 210*j*. Consequently, the map corresponding with the map entry 208*a* is determined to be one of the plurality of maps associated with the address-book entry 210*j*. In this case the particular map is classified as map hierarchy 1 (208*a*, 408) and can be found in the directory 'c:\country\usa.map' (208*a*, 410).

Next, the search continues until record 208*c* of the map table 204 is compared against the address-book entry 210*j*. In this case the values of 'State' and 'TX' are contained in the 'Address-Book Field Reference' field 412 and the 'Address-Book Field Value' field 416 respectively. Thus, the value 'TX' is compared against the value defined for the 'State' field reference 314 within the address-book entry 210*j*. Again, a match is found. Consequently, the map corresponding with the map entry 208*c* is also determined to be one of the plurality of maps associated with the address-book entry 210*j*. In this case, the particular map is classified as map hierarchy 2 (208*c*, 408) and can be found in the directory 'c:\state\tx.map' (208*c*, 410).

Note that record 208*d* of the map table 204 may be compared against the address-book entry 210*j*. In this case the values of 'State' and 'NY' are contained in the 'Address-Book Field Reference' field 412 and the 'Address-Book Field Value' field 416 respectively. Thus, the value 'NY' is compared against the value defined for the 'State' field reference 314 within the address-book entry 220*j*, and a match is not found. Consequently, the search in map table 204 continues. Alternatively, once a map of a particular hierarchy is found to be associated with a particular address-book entry, all entries that comprise the same hierarchy can be ignored. As such, in this example, as soon as it is determined that map table record 208*c* is classified as 'hierarchy # 2', the next hierarchical map entry, for example map entry 208*e* may be searched.

Note that record 208*e* of the map table 204 may be compared against the address-book entry 210*j*. In this case, the values of 'City' and 'Austin' are contained in the 'Address-Book Field Reference' field 412 and the 'Address-Book Field Value' field 416 respectively. Thus, the value 'Austin' is compared against the value defined for the 'City' field reference 312 within the address-book entry 210*j*, and a match is found. Consequently, the map corresponding with the map entry 208*e* is determined to be one of the plurality of maps associated with the address-book entry 210*j*. In this case the particular map is classified as map hierarchy 3 (208*e*, 408) and can be found in the directory 'c:\city\austin.map' (208*e*, 410). Eventually, record 208*g* of the map table 204 is compared against the address-book entry 210*j*. In this case, the values of 'Site' and '632' are contained in the 'Address-Book Field Reference' field 412 and the 'Address-Book Field Value' field 416 respectively. Thus, the value '632' is compared against the value defined for the 'Site' field reference 318 within the address-book entry 210*j*, and a match is found. Consequently, the map corresponding with the map entry 208*g* is also determined to be one of the plurality of maps associated with the address-book entry 210*j*. In this case the particular map is classified as map hierarchy 4 (208*g*,408) and can be found in the directory 'c:\floor_plan\632.map' (208*g*, 410).

In the manner outlined above the list of associated maps for address-book entry 210*j* has now been determined. Next, as previously described the present invention determines the most appropriate map to display to the requester. The map selected depends upon the relative locations of the requestor and the requestee. One method which can be used to select the most appropriate map is as follows.

A list of associated maps related to the location of the requestor is derived in a similar fashion as previously described. The list of associated maps for the requestor, is compared against the list of associated maps for the requestee. The comparison is performed in an order of increasing hierarchy. For example, the requestor's map associated with a map hierarchy of 1, is compared against the requestee's map associated with a map hierarchy of 1. If both such maps are different, the requestee's map is immediately displayed. If both such maps are the same, the next set of maps associated with the next level of hierarchy (in this case 2), are compared. This process is repeated until the two maps associated with the same hierarchy are different with respect to the requestee and the requester. Once a different pair of maps is found, the requestee's map associated with that hierarchy is immediately presented to the requester. In this manner, the map which makes most sense to display first (the default map) is displayed. Thus, the requester sees the first map which is different than would be produced for the requester (to the requestee), starting with the first hierarchy number and working toward the greatest hierarchy number. In addition, a list of all of the maps associated with the requestee's location is presented to the requester, so that any one of the associated maps may be selected for viewing.

Continuing with the example above, the procedure used to find the plurality of associated maps for the requestee is used to determine the plurality of associated maps for the requester. This results in finding that map entries 208a and 208d are among the plurality of map table entries associated with the requestor's address-book table entry 210q. Accordingly, a comparison of both hierarchy 1 maps (namely 'c:\country\usa.map' (208a, 410)), yields that a common hierarchy map exists between the requestee and the requestor. Next, a comparison of both hierarchy 2 maps, yields that a difference exists between the two maps. In this case the requestee's hierarchy 2 map is 'c:\state\tx.map' (208b, 410), and the requestor's hierarchy 2 map is 'c:\state\ny.map' (208d, 410). Thus, the requestee's hierarchy 2 map is selected as the default map for display and is immediately displayed to the requestor.

Note in this case, both the requester and requestee reside in different states. Consequently, a map on the state level is selected as the most appropriate map to display to the requester, based on the relative locations of the requestor and the requestee. If, in the example above, the requestor and requestee lived in the same state but different cities, a map depicting the requestee's city would be selected as the most appropriate map. Similarly, if the two parties lived in the same city, a map depicting a finer granularity would be selected, such as a street map, a corporate site map, or a building map. If the requestor and the requestee both share a common plurality of maps, the map that is defined as the lowest or finest granularity will be selected as the most appropriate map. As stated, a list of all of the maps associated with the requestee's location also is presented to the requestor, so that any of the associated maps may be selected and viewed.

In this example, wherein the requester is associated with the record 210q and the requestee is associated with the record 210j, the 'Last Person Mapped' and 'Access Status' fields of the requestee's record ((210j, 326) and (210j, 328)), are of no importance. Instead the requestor's fields (210q, 326) and (210q, 328) will contain appropriate information pertaining to the requestee.

Continuing now with the example above, information from the child point table 401 is incorporated into the display of the selected map. Information in the child point table 401 is used to highlight a point on the map being displayed to the requestor (a map depicting the state of Texas). The map table entry 208c defines the value of 'City' in the 'Point Reference' field 418. A non-zero value indicates that there is child point table information associated with the map entry 208c. As stated, a zero value in the Point Reference and Point Description fields indicate that there are no child point table information associated with a particular map table entry (such as map table entries 208e and 208n).

Next, the child point table 401 is examined to determine which entries are joined with the map table entry 208c. Thus each entry 424 within the child point table 401 is examined and compared against the map table entry 208c. As previously described, the values within the two table joining fields 408 and 410, contained in the map table entry 208c, are compared against the values in the corresponding table joining fields 428 and 430 within each child point table entry 424. A match of both table joining fields between the two tables 204 and 401, indicates that a particular child point table entry 424 is associated with the map table entry 208c.

In this case, child point table entries that are associated with the map table entry 208c are retrieved. This consists of child point entry 424b. As seen in FIG. 4, both the map table entry 208c and the child point table entry 424b contain the value of '2' in their corresponding 'Hiearchy #' fields 408 and 428. In addition, both the map table entry 208c and the child point table entry 424b contain the value of 'c:\state\tx.map' in their corresponding 'Map Pointer' fields 410 and 430.

Next, the combination of the 'Address-Book Field Value' of Austin' (424b, 432) from the child point table 401, and the 'Point Reference' field value of 'City' (208c, 418), from the map table 204 is used to compare against the corresponding field and value in the address-book table entry 210j. If a match is found, the child point table entry 424b is associated with the map table entry 208c and the particular address-book field entry 210j. In this case a match is found. Consequently, the coordinates '300,60' (424b, 434) defined in the associated child point table entry 424b are used to highlight a point on the map being displayed to the requestor. In this case, the city of Austin is highlighted on the display of the map of the State of Texas.

Note that a plurality of child point table entries 424 is typically associated with each map table entry 208. For example, all of the cities that are defined in the state of Texas may have an associated entry in the child point table 401. Each of these entries in the child point table will be associated with the same map table entry 208 within the map table 204.

Thus, the map table 204 typically contains a plurality of entries for each hierarchy number. Child point table entries 424 are optionally provided to further detail information to the map. The child point table 401 typically contains a plurality of entries for each single entry in map table 204 that specifies child point table 401 information, via non-zero values in the Point Reference and Point Description fields (418 and 420).

Figure 5A:
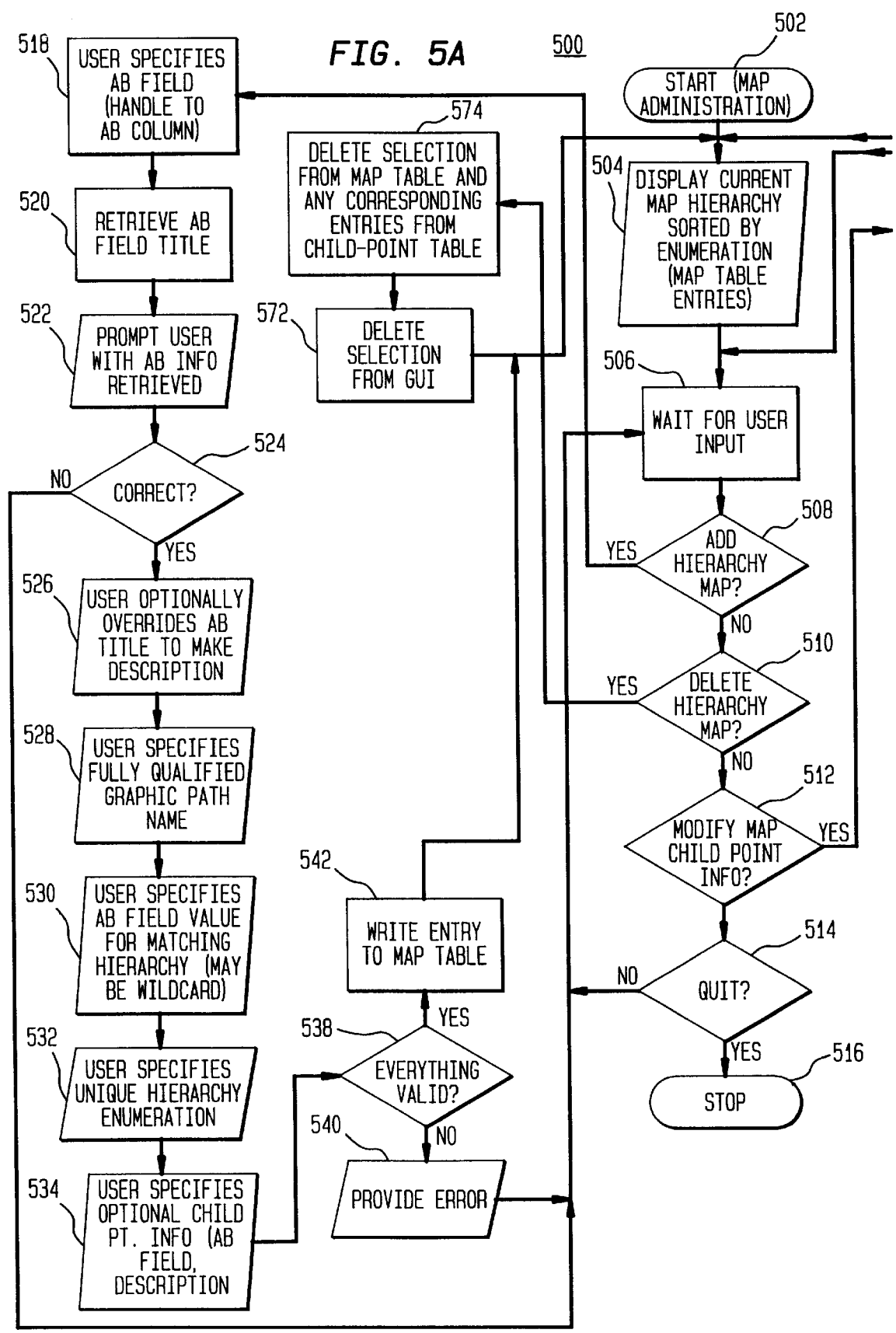
FIG. 5 is a flowchart depicting the map administration aspect of the present invention.
Figure 5B:
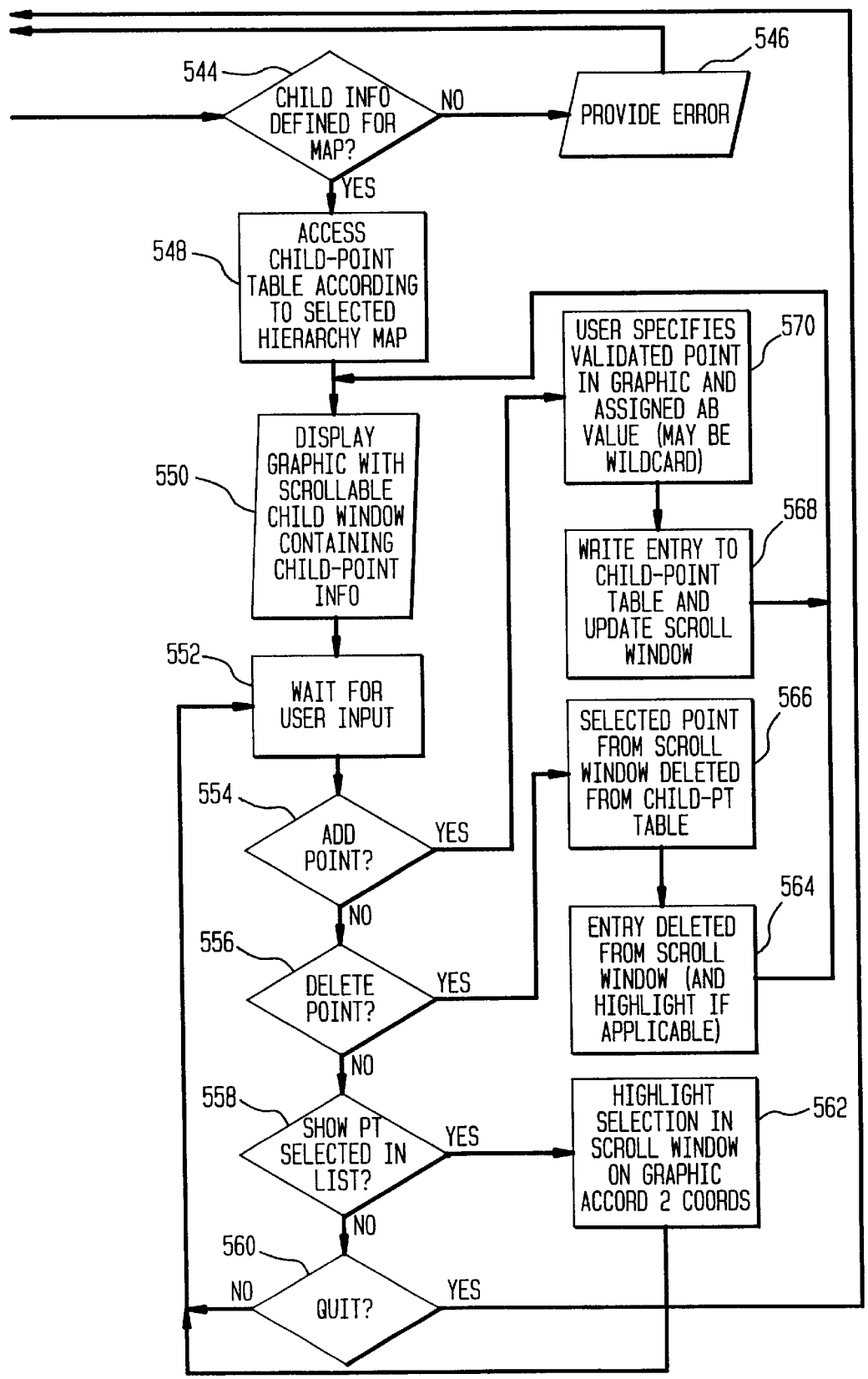

FIG. 5 depicts the map administration aspect of the present invention. An example of a process used to modify the contents of the map table 204 and child point table 401 will now be described with reference to the FIG. 5. The process 500 begins with step 502 where an authorized administrator invokes the map administration program of the present invention. Control then immediately passes to step 504. In step 504, the process 500 displays the current contents of the map table 204. Typically this display is presented in a scrollable window of a graphical user interface (GUT) where the records 208 are presented in a list format. Generally the records are sorted in order of their associated hierarchy and may be sorted on other fields within the hierarchy. Further, a particular record 208, within the scrollable list may be selected by the user (hereinafter a selection made by a user in step 504 is referred to as the 'selected' record).

Next as step 506 indicates, input is accepted from the user. The input accepted in step 506 indicates which of the following four functions (depicted by steps 508, 510, 512, and 514) is to be performed. Step 514 determines if the user selected to quit in which case, the process ends as indicated by step 516. Step 516 terminates the graphical user interface (GUI) appropriately (e.g. removes window produced by step 504) before ending process 500. The three functions that are depicted by steps 508, 510 and 512 will now be discussed.

The function to add a hierarchy map to the map table 204 begins with step 508. The term 'hierarchy map' is synonymous with 'map table record' or 'map table entry' 208, as previously described. If the administrator selected to add a new map entry 208 then step 508 determines that, and the process then flows to step 518.

In step 518, the user specifies the 'Address-Book Field Reference' 412 that is associated with the new map entry 208. Generally, the user identifies the 'Address-Book Field Reference' 412 by specifying a 'handle' to the address-book column associated with the address-book field reference (the use of handles are well known in the field of data processing). In step 520 the address-book field title (field heading in row 302) is retrieved from the address-book 201, and is displayed for the user in step 522. In one embodiment, the field reference (column heading of row 302) is explicitly specified in step 518. The decision in step 524 pertains to whether or not the information presented in step 522 is correct. For example an incorrect handle specified in step 518 will result in an unexpected address-book field reference title presented in step 522. Thus, if the information presented in step 522 is not correct as determined by the administrator, control passes back to step 506 to accept further input from the user.

If the information in step 522 is correct as determined by the administrator in step 524, control passes to step 526. In step 526 the user specifies the value of the 'Description' field reference 414 as previously described. As indicated in step 526, in a preferred embodiment of the present invention, the description field entry is optional. If the user prefers not to add a description in step 526, a default value is automatically entered into the 'Description' field 414. Typically a default value will comprise the title of the "Address-Book Field Reference" 412, (which was identified by the user in step 518). Next, control passes to step 528.

In step 528 the user specifies the value of the map pointer 410 as previously described. Generally, this comprises a pointer to the corresponding geographical image file associated with the new map entry 208. Control then passes to step 530. In step 530 the user specifies the 'Address-Book Field Value' 416 used to associate the new record 208 with one or more address-book entries 210 within the address-book 201. In step 532 the user specifies the hierarchy number 408 of the new map table record 208. Control next passes to step 534.

In step 534 the user specifies whether or not there is child point table information associated with the new map table entry 208. As previously stated, there are two fields associated with child point table information within the map table 204. Such fields are the 'Point Reference' field 418 and the 'Point Description' field 420. If there is child point table information associated with the new map table entry 208, both fields are supplied by the user in step 534. Control then passes to step 538.

In step 538 the process performs an error check on all of the data entered in the previous steps 518 through 534. If the data is not valid, an appropriate error message is displayed in step 540 and control passes back to step 506 to accept additional input from the user.

If the data entered is valid, control passes to step 542. In step 542, the data entered from steps 518–534 is written as an entry 208 to the map table 204. Control then passes back to step 504 where a display of the current map table is presented to the user including the new map table entry 208 just entered in the preceding steps 518–534.

The next function that may be performed by an administrator during process 500 begins with step 510. If the administrator selects to delete a hierarchy map from the list presented in step 504, then as determined by step 510 control to perform this function immediately passes to step 574. In step 574 the selected record 208 is deleted from the map table 204. Additionally, as step 572 indicates, the display depicting the map table 201, as presented in step 504, is updated to remove the map entry 208 that was just deleted. Control then passes back to step 504 for processing as heretofore described.

The next function begins with step 512. If the administrator selects to modify child point table information for a selected map entry 208, as determined by step 512, then processing passes to step 544. In processing subsequent to step 512, entries 424 within the child point table 401 that are associated with the selected record 208 may be modified. The function to modify child point table information begins with step 544. In step 544 a check is performed to determine whether child point table information exists for the currently selected map entry 208. As stated, child point information exists for a particular map entry 208, if the 'Point Reference' field 418 and the 'Point Description' field 420 contain non-zero values.

Accordingly, if child point information does not exist for the selected record 208, an error message is displayed in step 546 and control passes back to step 506 to accept additional input from the user. If child point information does exist for the selected map entry 208, control passes to step 548.

In step 548 the child point table 401 is accessed for all entries 424 corresponding to the selected map entry 208 and control passes to step 550. In step 550 a GUI window similar to the window of step 504 is presented to the user. This window contains a scrollable and selectable window comprising all of the records within child point table 401 that are associated with selected map table record 208. Next, control passes to step 552 where the user can select one of the four functions depicted by steps 554, 556, 558, and 560.

In step 554, if it is determined that the administrator selected to add a point to the child point table 401, control passes to step 570. A new record 424 can be added to the child point table 401. The new record is automatically associated (or joined, as previously discussed) with the selected record 208 in the map table 204. In step 570, values for the 'Address-Book Field Value' field 432 and the 'Coordinates' field 434 is accepted from the user after display of the graphic according to the 'map pointer' field 410 of the selected map entry 208. Note that the other two fields comprising the child point table 401, namely the hierarchy field 428 and the map pointer field 430 are filled in automatically from the corresponding fields in the selected map table entry 208. The preferred embodiment allows the user to select an arbitrary point on the displayed map graphic with a mouse, thereby automatically generating the 'Coordinates' field 434. Next as step 568 indicates, the child point table is updated with a new record.

Next, control passes back to step 550 where the window is refreshed with the new map table entry and another child point table function may be subsequently selected. Another child point table modification function that can be performed is a function to delete an entry 424 from the child point table 401. Administrator selection for this function is determined in step 556 where control passes to step 566. In step 566 the selected child point table entry 424 within the window presented in step 550 is deleted from the child point table 401. Next, as step 564 indicates, the selected point is removed from the window and control passes back to step 550 for processing as previously described.

Step 558 determines if the administrator selected to display the specific child point table point in the graphical image map. If the administrator selected to display the point, then step 562 displays the map graphic according to 'Map Pointer' 410 associated with the selected child point table entry 424. The coordinates representing the point that is specified by the currently selected record 424 in the child point table 401 is highlighted on the graphical display of the map corresponding to the selected map table record 208. Control passes back to step 552 (when the administrator chooses to leave step 562) to wait for additional input from the user. Finally, when the user is finished modifying records within the child point table 401, step 560 determines if the administrator selected to quit, in which case control passes back to step 504. Thus, process 500 allows administration of the Map Table 204 and the child point table 401.

Figure 6:
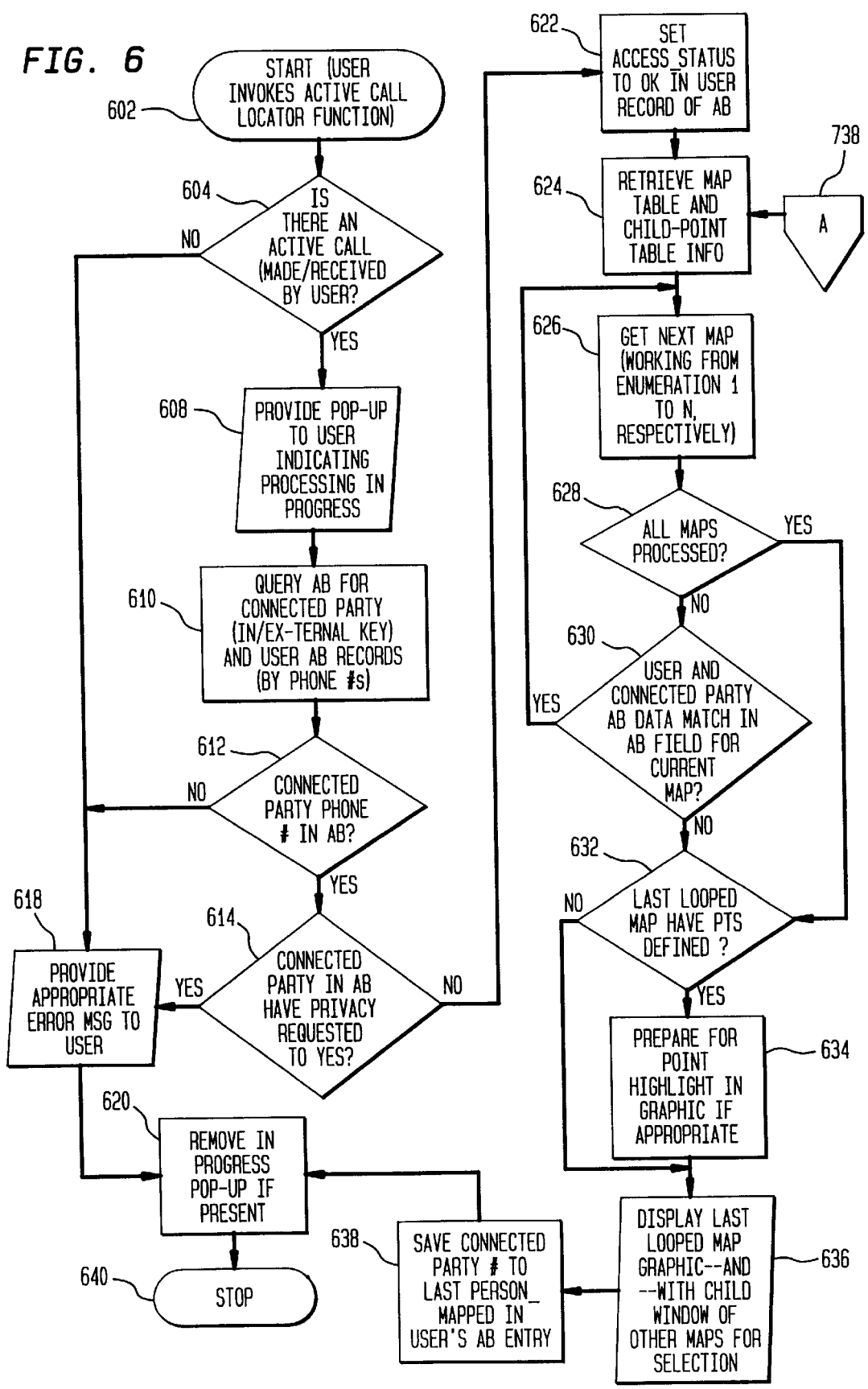
FIG. 6 is a flowchart depicting the active session invocation aspect of the present invention.

FIG. 6 depicts the active session invocation aspect of the present invention. An example of a process for invoking a location function based on an active session, such as a telephone connection, will now be described with reference to the flowchart in FIG. 6. The process begins with step 602 where the user invokes the active locator function. In this example, the 'user' and the 'connected party' perform the functions of the requestor and the requestee respectively, as previously described herein.

In step 604, the process determines whether there is currently an active session (for example, a telephone connection) between the user and a connected party. If there is not a currently active session, control passes to step 618. In step 618 an appropriate error message is provided to the user. Next as step 620 indicates, an in-progress message (discussed below), is removed from the display screen, if present (in this case, there is no such message present). Finally, the process ends with steps 640. Thus, the active session invocation function should be invoked during an active session such as during a telephone call.

The procedures used to invoke the active call locator function (step 602) and to determine the existence of a currently active telephone call (step 604) depends upon the specific embodiment of the present invention. For example, if a specific embodiment uses the telephone/computer systems (such as the system 104 depicted in FIG. 1), a user typically invokes the locator function by issuing a command on the computer device 108. If a device such as the smart-phone 114 is used, a user typically invokes the locator function by entering a command directly into the smart-phone 114 or by pressing a particular pre-defined button or the like.

In both cases, the devices 114 and 104 are capable of determining information pertaining to an active telephone connection. For example, both the smart-phone 114 and the telephone/computer system 104 can determine the telephone number of both the user and the connected party. The user's phone number (i.e. the phone number of the requestor) and the connected party's phone number (i.e., the phone number of the requestee) is determined with the called number (number dialed) and the caller's number (caller id) for the particular phone call. The telephone numbers are used to look up the associated address-book entries 210 for both the user and the connected party. Many alternative procedures may also be used for determining the location information pertaining to the parties at each end of a telephone connection. For example, the social security number, or some other unique id may be used to associate address-book entries 210 to each party of a call. Further still, alternative embodiments provide communication means other than a telephone call which connects parties. As such, the examples used herein should not be construed to limit the scope of the present invention.

If step 604 determines that a currently active session is present, control passes to step 608. In step 608, a message is provided to the user indicating that the locator function is in progress. In step 610, the contents of the address-book 201 is searched for the presence of entries 210 associated with the user and the connected party. As stated, the phone numbers of both parties can be used as a search criteria to perform this task. Next in step 612, the process determines whether or not the connected party has an associated entry in the address-book 201. It is assumed the user is present in the address-book 201 since he is invoking the processing of FIG. 6. If the connected party is not listed in the address-book 201, control passes to 618 where an appropriate error message is provided to the user. Next, the in-progress indicator from step 608 is removed from the display and the process ends as steps 620 and 640 indicate.

If step 612 determines that the connected party is listed in the address-book 201, control passes to step 614 (discussed below). In step 614, the address-book is examined to determine whether or not the connected party has requested privacy (through query of 'Location Privacy Indicator' field 322), as previously discussed. If the connected party has requested privacy, control passes to step 618 and an appropriate error message is provided. Next, the in-progress indicator from step 608 is removed from the display and the process ends as steps 620 and 640 indicate.

If step 614 determines that the connected party has not requested privacy, control passes to step 622. In step 622 the address-book record 210 associated with the user is updated. Specifically, the 'Access Status' field is updated in the user's entry 210 with the status of 'OK' to indicate that access to location information pertaining to the connected party is granted. Next as step 624 indicates, the information associated with the map table 204 and the child point table 401 is retrieved. Step 624, as previously described, represents the processing of the two database tables (the map table 204 and the child point table 401), performed in order to retrieve the associated map table entries 208 and child table entries 424 for both the user and the connected party.

After such information is retrieved and stored (e.g. within a storage device such as a fixed disk or a main memory unit), control passes to step 626. In step 626 the list of associated maps corresponding to the user and the connected party are processed in order of their specified hierarchy as previously discussed. The first hierarchy to be processed by the loop depicted by steps 628–632 is hierarchy 1 and the last hierarchy to be processed is hierarchy N (as defined by the connected party's set of associated maps). Steps 626–636 depict a process as previously described herein, that determines the best or most appropriate map to display to the user.

In step 628 the process determines whether it is finished processing the list of associated maps. The 'Y' branch in step 628 is taken when all of the hierarchy maps associated with the called party have been compared against each of the hierarchy maps associated with the user, and a difference between the two sets of maps has not been found (in step 630 below). This condition will occur when both sets of hierarchy maps are identical (at least insofar as the highest numbered hierarchy map associated with the connected party is concerned). For example, suppose the user and the connected party have the same set of associated maps (i.e. they both reside in the same country, same state, same city and same building). Thus, all of the maps will be processed (within the loop 626–630), before a difference is found (depicted by the 'N' branch in step 632). Thus, control passes from step 628 to step 632 and the 'last looped map' referred to in step 636 (generally the most appropriate map), is the map with the highest hierarchy (lowest granularity) defined for the connected party.

If step 628 determines that map processing is not complete, control passes to step 630. In step 630, the process determines whether the maps associated with the particular hierarchy currently being processed is the same for the user and the connected party. The maps are equivalent if the Map Table entry 208 and all associated Child Point Table entries 424 (if applicable) are equivalent. As previously discussed, the most appropriate map to be displayed in step 636 is user's map of the lowest hierarchy number that is different than the corresponding connected party's map. The loop depicted by steps 626–630 continues with each loop processing the next highest hierarchy number (step 626), until either a difference is found ('N' branch in step 630), or all of the user's maps have been processed ('Y' branch in step 628), as previously discussed.

In step 632, the process determines whether the 'last looped map' has any points defined within a child point table 401. As stated, this is determined by the existence of non-zero field values for the 'Point Reference' field 418 and the 'Point Description' field 420 in the map table 204. The 'last looped map' is the map determined by the process as the most appropriate map to be displayed, as previously discussed. If the map has child points defined, control passes to step 634 where the child point entries 424 are processed, as previously discussed, and the appropriate entries 424 (typically one) are accessed and used for graphic point highlighting. Next control passes to step 636. If there are no child point table entries associated with the most appropriate map from step 632, control bypasses step 634 and passes directly to step 636.

In step 636 the most appropriate map is presented to the user on the display device (such as display device 113 or 108), preferably within a window. If one or more child point entries 424 are associated with the map (as determined and processed by steps 632–634), such points are highlighted on the display. In addition, a child window comprising a list of all of the other associated maps for the connected party is presented. The user has the option to select any of the associated maps to be presented on the display device (see FIG. 9).

Next control passes to step 638 where the address-book entry 208 pertaining to the user (requester) is updated. Here, an identification (such as a telephone number, social security number, employee number, address-book record number, etc.), of the connected party is stored in the address-book field reference 'Last Person Mapped', preferably the telephone number. Finally, as step 620 indicates the display screen is cleared of the in progress pop-up window that is present, and the process ends with step 640. The user then interfaces with windows as a result of step 636 (such processing is depicted and described below with reference to FIG. 9).

Figure 7:
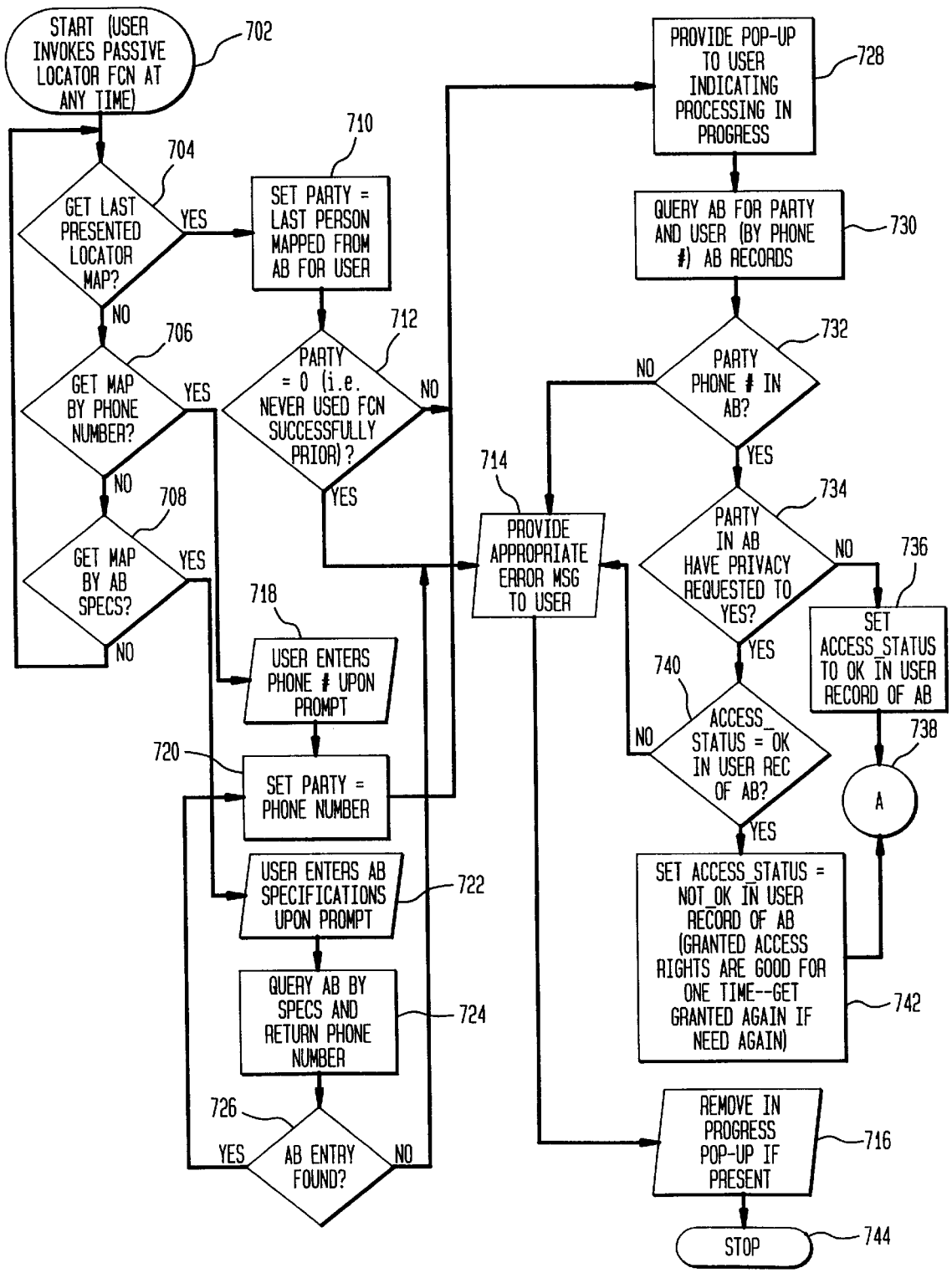
FIG. 7 is a flowchart depicting the passive invocation aspect of the present invention.

FIG. 7 depicts the passive invocation aspect of the present invention. An example of a process for invoking a passive locator function will now be described with reference to the flowchart in FIG. 7. A passive locator function is used independently of a currently active session, such as a telephone connection. The process begins with step 702 where a user invokes the passive locator function. The procedure used to invoke the passive locator function depends upon the specific embodiment of the present invention. For example, if a specific embodiment uses the telephone/computer systems (such as the system 104 depicted in FIG. 1), a user typically invokes the locator function by issuing a command to the computer device 108. If a device such the smart-phone 114 is used, a user typically invokes the locator function by entering a command directly into the smart-phone 114, or by pressing a particular button or the like.

In step 702 the user selects one of three options (depicted by steps 704, 706 or 708), that can be used to identify a party (requestee) that is the subject of a request for location information. Note that a successful operation of each of the three options 704, 706, and 708 results in storing a telephone number in a memory location called 'PARTY' (described below—see steps 710 and 720). In each of the three options this operation is followed by a process that begins with step 728 (barring errors which are also described below). Therefore, the three options that can be used to identify a requestee will each be described below—but only up to step 728. This will be followed by discussion of the process that begins with step 728, which will apply to all three of the options beginning with steps 704, 706, and 708.

In step 704 if the user requests location information pertaining to the last party in which location information was previously provided, then step 710 accesses the 'Last Person Mapped' field 326 within the address-book entry 210 associated with the user. The value contained in this field (preferably a telephone number) is stored in a memory location called 'PARTY'. In step 712, the process determines whether there is non-zero information located in the 'Last Person Mapped' field 326. A value of '0' in this field indicates that the user has never successfully viewed location information according to the present invention. Thus, there is no last party in which location information was previously provided. Accordingly, an appropriate error messages is displayed in step 714. Next control passes to step 716 where the process removes the in-progress window if present (in this case the re is no such window present). The process ends with step 744. If in step 712, it is determined that the user had successfully performed a locator function previously, then control passes to step 728 (discussed below).

If in step 706, the user opted for location information pertaining to a party that is to be identified by a telephone number, then control passes to step 718. In step 718 the user enters a telephone number. This telephone number is stored in the 'PARTY' memory location, as step 720 indicates and control passes to step 728 (discussed below).

If in step 708, the user opted for location information pertaining to a party that is to be identified by another address-book field reference (row 302) or a combination of two or more address-book field references, then the user specifies the address-book field reference(s) in step 722. In step 724 the address-book 201 is searched for an entry that matches the specification(s) entered in step 722. If a single matching entry is not found (step 726), control passes to step 714 where an appropriate error message is presented. Next control passes to step 716 where the process removes the in-progress window if present (in this case there is no such window present). The process then ends with step 744.

In step 726, if a single address-book entry 210 that matches the specification(s) entered in step 722 is found, control passes to step 720 where the 'PARTY' memory location is updated with the telephone number associated with the matching entry found in step 724.

An alternative embodiment, within the scope of the invention, of steps 722, 724, and 726 allows a user to specify criteria which produces multiple address-book entries 210 from which the user may then select the appropriate address-book entry 210 therefrom.

The processing that begins with step 728 will now be discussed. As stated, this processing applies to successful completions of each of the processes that begin with steps 704, 706, and 708. In step 728, a pop-up window is provided to indicate that the passive locator function is in progress. Next, control passes to step 730. In step 730, the address-book table 201 is accessed for information pertaining to the user and the person identified by the telephone number in the 'PARTY' memory location.

In step 732, the process determines whether the party identified by the telephone number in the 'PARTY' memory location is located in the address-book 201. If such party is not located in the address-book 201, an appropriate error message is displayed in step 714 and the pop-up window from step 728 is removed in step 716. The process then ends in step 744.

If step 732 determines that the party identified by the telephone number in the 'PARTY' memory location has an associated address-book entry 210, control passes to step 734. In step 734, the entry associated with the party is retrieved in order to determine whether privacy has been requested by the party, as previously discussed. If the party has not requested privacy (as determined by 'Location Privacy Indicator' field 322), control passes to step 736. In step 736, the user's 'Access Status' field 328 in the address-book 201 is set to 'OK'. Next control passes to step 738 (described below). If privacy has been requested, as determined by step 734, control passes to step 740.

In step 740, the process determines whether the 'Access Status' field 328 located in the user's address-book entry 210 is set to 'OK' and whether the 'Last Person Mapped' field 326 in the user's address-book entry 210 is set to the party in the 'PARTY' memory location. If the 'Access Status' field 328 field does not contain the value of 'OK' for the party in the 'Last Person Mapped' field 326, control passes to step 714. In step 714 the user is provided with an appropriate error message indicating access is not permitted and the pop-up window from step 728 is removed in step 716. The process then ends as step 744 indicates.

In step 740, if the process determines that the 'Access Status' field 328 contains the value of 'OK' and the 'Last Person Mapped' field 326 contains the party in the 'PARTY' memory location, then control passes to step 742. In step 742, the access status is set to 'NOT-OK' and control passes to step 738. This value is set to 'NOT_OK' because in this in this example the access rights (which are granted by users having requested privacy) is good for one-time access only. In other embodiments of the present invention, it may be desirable to grant permanent access to specific parties. An example of a process that can be used to grant a user access rights is subsequently discussed herein with reference to FIG. 8.

The process that begins with step 738 is depicted in FIG. 6 (as indicated by the off page connector 'A' 738 in FIG. 6). The process 738 is the same process as previously discussed, as represented by steps 624–640 in FIG. 6. To summarize, the process 738 is used to: (1) retrieve the list of associated maps for both the requester and requestee (step 624); (2) select the most appropriate map to be displayed to the requestee (steps 626–632); (3) process the associated child point table entries 424, if any (step 634); (4) display the most appropriate map (including highlighted points, if any) and provide a child window comprising the list of all maps which can be viewed by the requester (step 636); (5) update the requestor's 'Last Person Mapped' field 326 in the address-book 201(step 638); and (6) remove the in-progress pop-up window from the display screen (step 620). Finally, as step 640 indicates, the process ends as does the process depicted by the flowchart in FIG. 7.

Figure 8:
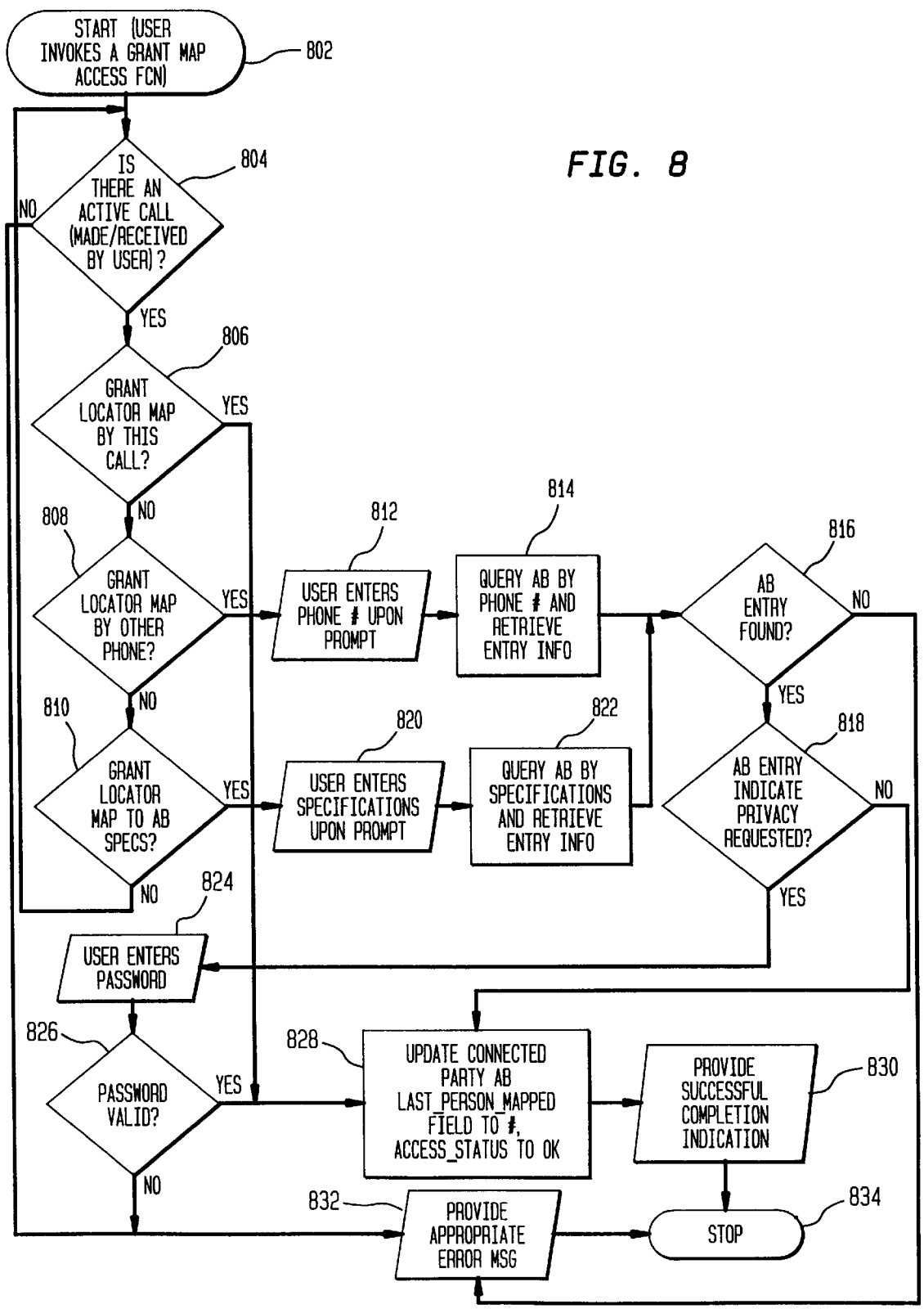
FIG. 8 is a flowchart depicting the granting access to private locator information aspect of the present invention.

FIG. 8 depicts the present invention aspect for granting access to private locator information. An example of a process used to by a requestee (user) to grant a requester permission to access location information will now be described with reference to the flowchart in FIG. 8. This procedure is used whenever a requester makes a request to view location information pertaining to a party that is currently on the opposite end of an active session, such as a telephone connection. Generally, this process will be initiated by a requestee in response to a verbal request by a requestor for access permission rights. For example, such a verbal request is made in response to an error message (see steps 614 and 618, as well as steps 734, 740 and 714) regarding the unavailability of location information due to the privacy feature of the present invention, as previously described. Once permission is granted according to the process in FIG. 8, the active session invocation function (beginning with step 602 in FIG. 6) and/or the passive locator function (beginning with step 702 in FIG. 7) may be used to gain access to location information even though requestee has specified a value of 'Yes' in the 'Location Privacy Indicator' field 324.

The process begins with step 802. In step 802 the user invokes a grant map access function. In step 804 the process determines whether there is an active session, for example a telephone call made to or received by the user. If an active call is not present, control passes to step 832. In step 832 an appropriate error message is provided to the user and the process ends in step 834. Thus, the preferred embodiment requires an active session in order to grant access.

If step 804 determines that there is an active session present, control passes to step 806. Step 806 determines if the grantor opted to grant permission according to the active session, such as a telephone connection. Alternatively, in steps 808 and 810, the grantor may have opted to grant permission to someone else's locator information according to information of the person to grant rights to.

If in step 806, the grantor opted to grant permission of accessing location information to the party associated with the current active session, such as a telephone connection, then control passes to step 828. In step 828 the 'Last Person Mapped' field 326 within the address-book entry 210 associated with the requester, is updated to reflect the telephone number of the grantor. Further, the 'Access Status' field 328 in the same address-book record 210 is updated with the value 'OK'. Next, in step 830, a message indicating a successful completion of the process is presented to the user(s) and the process ends with step 834. Note that once the two fields in step 828 have been updated, the requestor is now able to perform the active session invocation function (beginning with step 602 in FIG. 6) and/or the passive locator function (beginning with step 704 in FIG. 7), which will result in a display of the maps associated with the grantor, as previously discussed. Also note that the 'Y' branch of step 806 and subsequent processing may be processed during the same call that the active session invocation function processing of FIG. 6 is processed.

If in step 806 the grantor chooses to grant permission to someone else's location information to the person location identified by the current call, then control passes to step 808. If in step 808, the user opted to grant rights to the connected party in order to see someone else's locator information, control passes to step 812 (discussed below), otherwise control passes to step 810 (also discussed below). In step 812, the grantor enters the telephone number of the person for whom to see location information for, and control passes to step 814. In step 814 the address-book 210 is searched to find a matching entry associated with the phone number entered in step 812. In step 816 the process determines whether a matching address-book entry 210 has been found. If matching address-book entry 210 is not found, an appropriate error message is provided in step 832 and the process ends in step 834. If a match is found, control passes to step 818.

In step 818 the matching address-book entry 210 is examined to determine if privacy has been requested (i.e. whether the 'Location Privacy Indicator' is set to 'Yes'). If privacy has not been requested control passes to step 828. In step 828, the 'Last Person Mapped' field 326 within the address-book entry 210 associated with the requestor (the connected party), is updated to reflect the telephone number specified in step 812. Further, the 'Access Status' field 328 in the same address-book record 210 is updated with the value 'OK'. Next, in step 830, a message indicating a successful completion of the process is presented to the user(s) and the process ends with step 834.

If step 818 determines that privacy has been requested, control passes to step 824. In step 834 the grantor enters a password which must match that of the address-book entry 210 for which location information access is to be requested. The correct password for an associated address-book entry 210 is provided by the value contained in the address-book field reference 'Location Privacy Password' 324, as previously discussed. In step 826, the process checks for the validity of the password entered in step 824. If the password is valid, control passes to step 828. In step 828, the 'Last person Mapped' field 326 within the address-book entry 210 associated with the requester, is updated to reflect the telephone number associated with the grantor's alternate location. Further, the 'Access Status' field 328 in the same address-book record 210 is updated with the value 'OK'. Next, in step 830, a message indicating a successful completion of the process is presented to the user(s) and the process ends with step 834.

If in step 810 the grantor opted to grant permission to someone else's location information by specifying address-book criteria about the person, then control passes to step 820. In step 820, the grantor enters specifications that uniquely identify the associated address-book table entry 210 corresponding with the alternate location. The specification entered in step 820 can be another field such as 'employee serial number', 'social security number', etc. or a combination of fields. In step 822 the address-book 210 is searched to find a matching entry associated with the address-book specification entered in step 812. In step 816 the process determines whether a single matching address-book entry 210 has been found. If a single matching address-book entry 210 is not found, an appropriate error message is provided in step 832 and the process ends in step 834. If a match is found, control passes to step 818.

An alternative embodiment within the scope of the invention of steps 820, 822 and 816 allows a user to specify criteria which produces multiple address-book entries 210 from which the user may then select the appropriate address book entry 210 therefrom.

In step 818 the matching address-book entry 210 is examined to determine if privacy has been requested (i.e. whether the 'Location Privacy Indicator' is set to 'Yes'). If privacy has not been requested control passes to step 828. In step 828, the 'Last Person Mapped' field 326 within the address-book entry 210 associated with the requester, is updated to reflect the telephone number associated with the address book entry 210 form step 822. Further, the 'Access Status' field 328 in the same address-book record 210 is updated with the value 'OK'. Next, in step 830, a message indicating a successful completion of the process is presented to the user and the process ends with step 834.

If step 818 determines that privacy has been requested, control passes to step 824. In step 824 the grantor enters a password. The correct password for an associated address-book entry 210 is provided by the value of the address-book field reference 'Location Privacy Password' 324. In step 826 the process checks for the validity of the password entered in step 824. If the password is valid control passes to step 828. In step 828, the 'Last Person Mapped' field 326 within the address-book entry 210 associated with the requester, is updated to reflect the telephone number associated with the address book entry 210 from step 822. Further, the 'Access Status' field 328 in the same address-book record 210 is updated with the value 'OK'. Next, in step 830, a message indicating a successful completion of the process is presented to the user(s) and the process ends with step 834.

Figure 9:
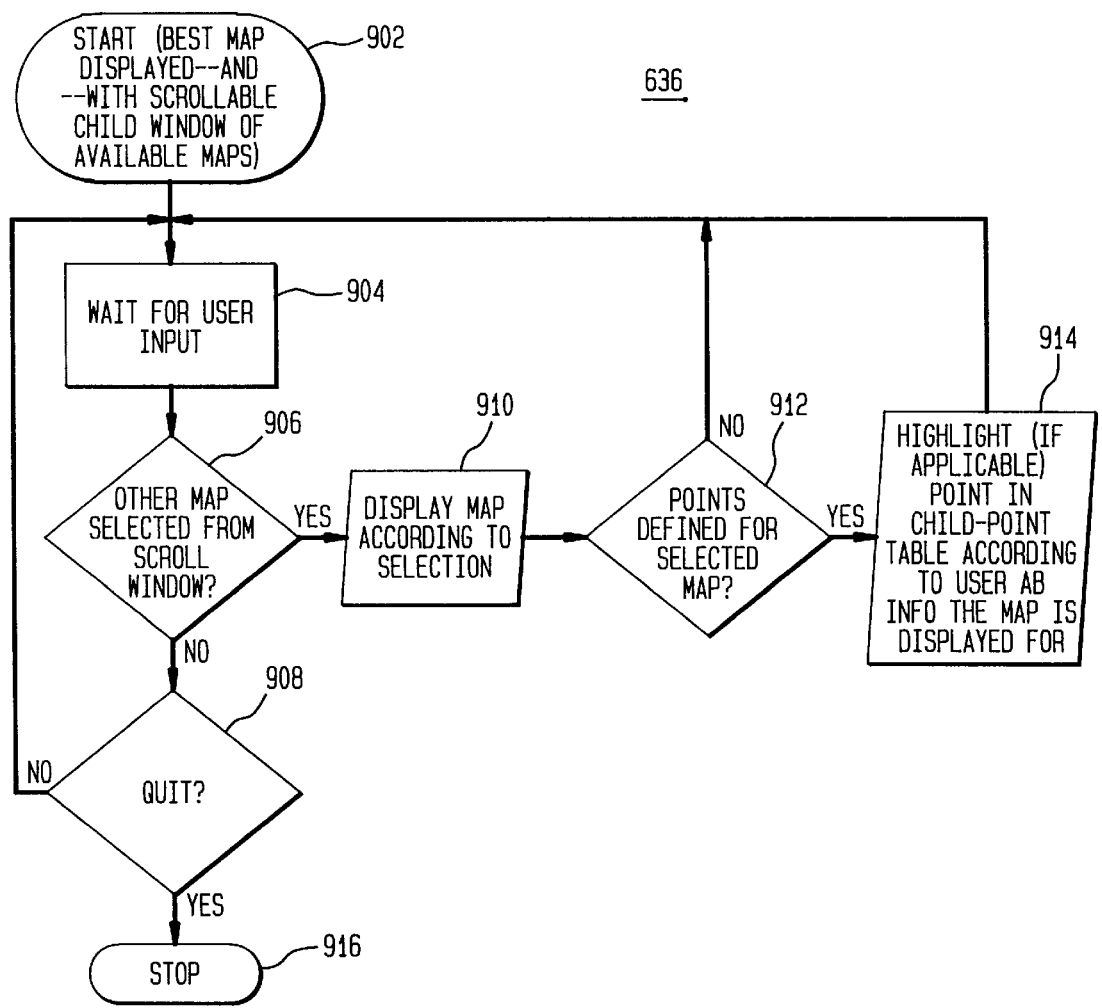
FIG. 9 is a flowchart depicting the map navigation aspect of the present invention.

FIG. 9 depicts the map navigation aspect of the present invention. An example of a process used to display the most appropriate map along with a child window depicting the other maps available for display, will now be discussed with reference to FIG. 9. This process represents a detailed description of a process that can be used to perform the function associated with results of step 636, as previously discussed.

The process begins with step 902 where a display of the best or most appropriate map, according to the present invention, is presented. In addition, a scrollable and selectable window (available map window), comprising a description of the additional maps that may be view is presented. The user has the option to select any one of the maps presented in the available map window. In step 904 the process waits for user input which indicates a map selection within the available map window. If step 906 determines that a map has not been selected, control passes back to step 904 to wait for additional user input.

If step 906 determines that a map has been selected, from the scrollable and selectable window, control passes to step 910. Otherwise control passes to step 908 (discussed below). In step 910 the selected map, according to the associated map table entry 208, is displayed. Control then passes to step 912. In step 912, the process determines whether there are any child point table entries 424 associated with the map table entry 208 (corresponding with the map currently being displayed). If not, control passes back to step 904 to wait for additional user input. If child point table entries 424 are associated with the map table entry 208, such table entries 424 are processed and the associated points are highlighted on the currently displayed map, as previously described. Control passes next to step 904 to wait for additional user input. In step 908, if determination is made that the user quit from map display processing, then all windows are terminated and processing ends in step 916.

Figure 10:
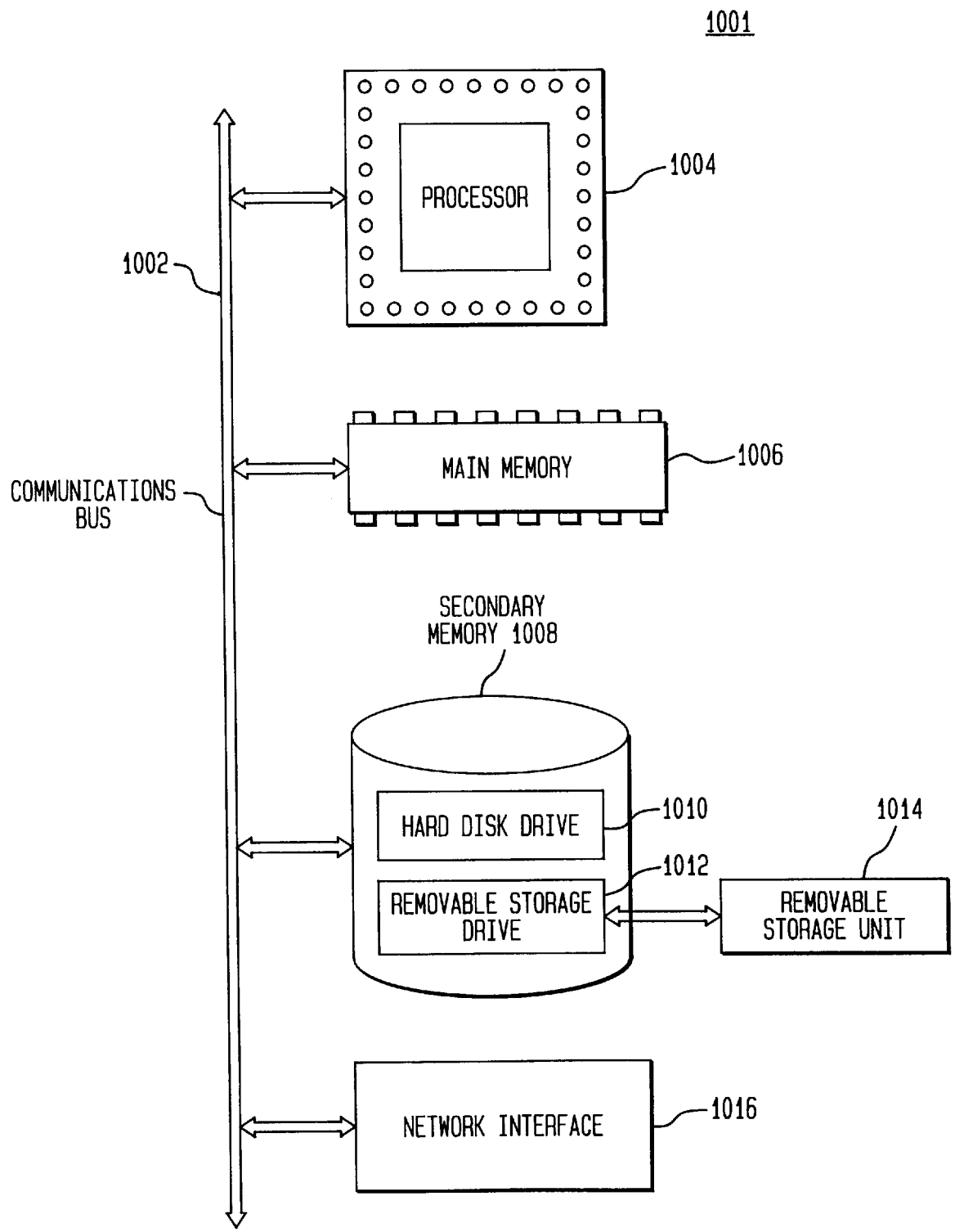
FIG. 10 is a block diagram of a computer system useful for implementing components of a preferred embodiment of the present invention.

In one embodiment, the present invention may be embodied in a general computer system. An exemplary computer system 1001 is shown in FIG. 10. The computer system 1001 includes one or more processors, such as processor 1004. The processor 1004 is connected to a communication bus 1002.

The computer system 1001 also includes main memory 1006, preferably random access memory (RAM), and a secondary memory 1008. The secondary memory 1008 includes, for example, a hard disk drive 1010 and/or a removable storage drive 1012, representing a floppy disk drive, a magnetic tape drive, a compact disk drive, etc. The removable storage drive 1012 reads from and/or writes to a removable storage unit 1014 in a well known manner.

Removable storage unit 1014, also called a program storage device or a computer program product, represents a floppy disk, magnetic tape, compact disk, etc. As will be appreciated, the removable storage unit 1014 includes a computer usable storage medium having stored therein computer software and/or data.

The computer system 1004 also includes a network interface 1016 which provides for communication via the telephone network as discussed herein. Computer programs (also called controllers) are stored in main memory and/or the secondary memory 1008. Such computer programs, when executed, enable the computer system 1001 to perform the features of the present invention discussed herein. In particular, the computer programs, when executed enable the processor 1004 to perform the features of the present invention. Accordingly, such computer programs represent controllers of the computer system 1001.

In another embodiment, the invention is directed to a computer program product comprising a computer readable medium having control logic (computer software) stored therein. The control logic, when executed by processor 1004, causes the processor 1004 to perform the functions of the invention as described herein.

In another embodiment, the invention is implemented primarily in hardware. Implementation of the hardware required to perform these functions described herein will be apparent to persons skilled in the relevant art(s).

The principles of the present invention may be applied to many different operating environments due to the flexibility of the arbitrary hierarchy. For example, the address-book 201 may comprise employees of a corporation, members of an organization, or locations pertaining to rooms in a hotel or attractions in a large mall, theme park or the like. Additionally, public address books could be used in an implementation of the present invention. For example, an address-book 201 according to the present invention can comprise all of the listings from all of the telephone directories around the world.

Moreover, entries 210 within address-books 201 can be dynamically created or updated based on the location and other information about a caller. For example, suppose a caller dials into a system (coupled with an embodiment of the present invention) from a cellular telephone. A location function provided by the cellular service provider can be used to dynamically update the caller's address-book entry 208 with the caller's current location information. Alternatively, complete information provided by a 'smart-phone' or by the telephone service provider, or the like, can be used to instantly create an address-book entry 210 for any caller that dials into such a system.

Many other variations of embodiments and implementations of the present invention are possible without departing from the principles disclosed herein. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus coupled with a communications system for presenting graphical data to a first party, depicting a location of a second party, said apparatus comprising:

an address-book database comprising information associated with the first party and the second party including a current location for the first party and the second party;

a map database coupled with said address-book database comprising a plurality of geographical maps;

a processor coupled with said address-book database and said map database, wherein said processor selects a set of associated maps pertaining to said current location for each party, said set of associated maps comprising at least one map from among said plurality of geographical maps; and a display, coupled with said geographical database, used to display at least one map within said set of associated maps.

2. The apparatus of claim 1 further comprising a point database coupled with said map database for maintaining a plurality of points, each point representing a specific location to be displayed with at least one of said geographical maps by said display.

3. The apparatus of claim 1 further comprising communication means for maintaining active communications between the first party and the second party.

4. The apparatus of claim 3 further comprising location determination means for finding said information associated with the first party based upon said active communications between the first party and the second party.

5. The apparatus of claim 4 wherein said location determination means is used to dynamically update said first storage means.

6. The apparatus of claim I wherein said plurality of geographical maps are arranged in discrete hierarchies, wherein each of said maps is classified in a particular discrete hierarchy according to its relative granularity.

7. The apparatus of claim 6 wherein each map within said set of associated maps is classified as a different hierarchy.

8. The apparatus of claim 1, wherein said processor is responsive to a request made by either the first or the second party.

9. The apparatus of claim I further comprising a selecting means for selecting a map from said set of associated maps, wherein said selecting means is based upon said location associated with the first party and said location associated with said second party.

10. The apparatus of claim 1 further comprising a privacy means for maintaining privacy wherein the first party selectively prevents the second party from viewing information pertaining to said location associated with the first party.

11. The apparatus of claim 10 further comprising permission granting means wherein the first party selectively grants permission to the second party thereby overriding said privacy means.

12. The apparatus of claim 1 wherein said display depicts a list of said associated maps, wherein any map within said list of associated maps is selectively displayed.

13. The apparatus of claim 1, wherein said address-book database can be accessed by the first and the second party.

14. A method for presenting graphical data to a first party, depicting a location of a second party, said method comprising the steps of:

(1) maintaining information associated with the first party and the second party including a current location for the first party and the second party;

(2) maintaining a plurality of geographical maps each including a graphical depiction of at least one said current location for the first party and the second party;

(3) selecting, in response to a request by the first party, a set of associated maps pertaining to said current location of the second party, said set of associated maps comprising at least one map from among said plurality of geographical maps; and (4) displaying to the first party, at least one map within said set of associated maps.

15. The method of claim 14 further comprising the step of finding said information associated with the first party based upon location information provided an active communication channel between the first party and the second party.

16. The method of claim 15 further comprising the step of dynamically updating said information pertaining to the first party by using said information provided by an active communication channel between the first party and the second party.

17. The method of claim 14 wherein step (2) further comprises the step of arranging said plurality of geographical maps into discrete hierarchies, wherein each said map is classified in a particular discrete hierarchy according to its relative granularity.

18. The method of claim 17 wherein each map from said selecting step which comprises said set of associated maps is of a different hierarchy.

19. The method of claim 14 wherein step (3) further comprises the step of selecting a selected map from said set of associated maps, wherein said selected map is based upon said specific location associated with the first party and said specific location associated with the second party.

20. The method of claim 14 wherein step (3) further comprises the step of maintaining a privacy feature wherein the first party may selectively prevent the second party from viewing information pertaining to said location associated with the first party.

21. The method of claim 14 further comprising the step of maintaining a plurality of points, each point representing a specific location to be displayed with at least one said geographical map.

22. The method of claim 14, wherein said information associated with the first party and the second party can be accessed by the first party and the second party.

23. The method of claim 14, wherein said selecting step is responsive to a request by the second party, and wherein said set of associated maps pertains to said current location of the first party.

* * * * *